US012709281B2

(12) United States Patent
Ma et al.

(10) Patent No.: US 12,709,281 B2
(45) Date of Patent: Aug. 18, 2026

(54) METHOD FOR IDENTIFYING ABNORMAL DRIVING BEHAVIOR

(71) Applicant: Yinwang Intelligent Technologies Co., Ltd., Shenzhen (CN)

(72) Inventors: Hongzhan Ma, Shenzhen (CN); Jiawei Yu, Shenzhen (CN); Gailiang Wang, Shenzhen (CN); Jun Jiang, Shenzhen (CN)

(73) Assignee: Yinwang Intelligent Technologies Co., Ltd., Shenzhen (CN)

( * ) Notice: Subject to any disclaimer, the term of this patent is extended or adjusted under 35 U.S.C. 154(b) by 134 days.

(21) Appl. No.: 17/959,066

(22) Filed: Oct. 3, 2022

(65) Prior Publication Data

US 2023/0025414 A1 Jan. 26, 2023

Related U.S. Application Data

(63) Continuation of application No. PCT/CN2020/083072, filed on Apr. 2, 2020.

(51) Int. Cl.
*B60W 40/10* (2012.01)
*G06N 3/02* (2006.01)

(52) U.S. Cl.
CPC ............... *B60W 40/10* (2013.01); *G06N 3/02* (2013.01); *B60W 2554/4046* (2020.02)

(58) Field of Classification Search
CPC ......... B60W 40/10; B60W 2554/4046; B60W 60/00188; B60W 2520/06;
(Continued)

(56) References Cited

U.S. PATENT DOCUMENTS 10,246,098 B2 4/2019 Fung et al.
10,358,143 B2 7/2019 Jain et al.
(Continued)

FOREIGN PATENT DOCUMENTS

CN 102713676 A 10/2012
CN 105774810 A 7/2016
(Continued)

OTHER PUBLICATIONS

Mingbo Du, "Research on Behavioral Decision Making and Motion Planning Methods of Autonomous Vehicle Based on Human Driving Behavior," University of Science and Technology of China, a dissertation for doctor's degree, Total 120 pages (Aug. 2016). With an English abstract.
(Continued)

*Primary Examiner* — Anne Marie Antonucci
*Assistant Examiner* — Luis G Del Valle
(74) *Attorney, Agent, or Firm* — Leydig, Voit & Mayer, Ltd.

(57) ABSTRACT

This application relates to the automated driving field and provides a method for identifying abnormal driving behavior, a system, and a vehicle including the system. The method for identifying abnormal driving behavior includes: obtaining vehicle driving behavior data; determining, based on the vehicle driving behavior data, whether a vehicle is in a state of suspicious abnormal driving behavior; obtaining current vehicle driving scenario data if the vehicle is in the state of suspicious abnormal driving behavior; and determining, based on the vehicle driving behavior data and the current vehicle driving scenario data, whether the suspicious abnormal driving behavior is abnormal driving behavior. In the technical solutions of this application, current driving scenario information is introduced to an identification process of abnormal driving behavior of the vehicle, so that
(Continued)

accuracy of identifying the abnormal driving behavior is improved.

19 Claims, 14 Drawing Sheets

(58) Field of Classification Search
CPC ......... B60W 2520/10; B60W 2552/53; B60W 2554/4042; B60W 2554/4044; B60W 50/0098; B60W 40/04; B60W 40/06; B60W 40/105; G06N 3/02; G08G 1/0141; G08G 1/096716; G08G 1/096758; G08G 1/096775; G08G 1/096791; G08G 1/0133; G08G 1/0129
See application file for complete search history.

(56) References Cited

U.S. PATENT DOCUMENTS

| | | | | |
|---|---|---|---|---|
| 11,838,826 | B1 * | 12/2023 | Chandrasekaran | G01C 21/3867 |
| 2009/0040054 | A1 * | 2/2009 | Wang | G06V 20/597 340/576 |
| 2013/0273968 | A1 * | 10/2013 | Rhoads | H04N 23/64 455/566 |
| 2017/0132521 | A1 | 5/2017 | Xu et al. | |
| 2019/0001964 | A1 * | 1/2019 | Lin | B60W 30/02 |
| 2019/0351914 | A1 * | 11/2019 | Yu | G07C 5/0841 |
| 2020/0269848 | A1 * | 8/2020 | Kang | G06N 20/00 |
| 2022/0121884 | A1 * | 4/2022 | Zadeh | G06N 3/006 |
| 2022/0126864 | A1 * | 4/2022 | Moustafa | B60W 60/0013 |
| 2024/0378992 | A1 * | 11/2024 | Ran | G08G 1/0125 |

FOREIGN PATENT DOCUMENTS

| | | | |
|---|---|---|---|
| CN | 105788250 | A | 7/2016 |
| CN | 103370252 | B | 8/2016 |
| CN | 106373331 | A | 2/2017 |
| CN | 106853830 | A | 6/2017 |
| CN | 107272654 | A | 10/2017 |
| CN | 107272687 | A | 10/2017 |
| CN | 107609602 | A | 1/2018 |
| CN | 107826118 | A | 3/2018 |
| CN | 108091133 | A | 5/2018 |
| CN | 108416270 | A | 8/2018 |
| CN | 108438001 | A | 8/2018 |
| CN | 108764111 | A | 11/2018 |
| CN | 108773373 | A | 11/2018 |
| CN | 108881364 | A | 11/2018 |
| CN | 109147368 | A | 1/2019 |
| CN | 109177983 | A | 1/2019 |
| CN | 109508576 | A | 3/2019 |
| CN | 109532847 | A | 3/2019 |
| CN | 109606284 | A | 4/2019 |
| CN | 109886209 | A | 6/2019 |
| CN | 110264825 | A | 9/2019 |
| CN | 110550038 | A | 12/2019 |
| CN | 110733509 | A | 1/2020 |
| CN | 110843794 | A | 2/2020 |
| CN | 110893858 | A | 3/2020 |
| CN | 110920539 | A | 3/2020 |
| WO | 2019047651 | A1 | 3/2019 |
| WO | 2020015574 | A1 | 1/2020 |

OTHER PUBLICATIONS

Lei Zuo,"Autonomous Driving Decision Making and Planning for Intelligent Vehicles Using Reinforcement Learning," National University of Defense Technology, Issue 01, Total 142 pages (Nov. 2016). With an English Abstract.

* cited by examiner

First apparatus

1001

Second apparatus

1002

Processor

1003

METHOD FOR IDENTIFYING ABNORMAL DRIVING BEHAVIOR

CROSS-REFERENCE TO RELATED APPLICATIONS

This application is a continuation of International Application No. PCT/CN2020/083072, filed on Apr. 2, 2020, the disclosure of which is hereby incorporated by reference in its entirety.

TECHNICAL FIELD

This application relates to the automated driving field, and furthermore, to a method for identifying abnormal driving behavior, an automated driving system, and an intelligent driving vehicle that uses the automated driving system.

BACKGROUND

With rapid development of 5G communication and Internet of vehicles technologies, an automated driving technology has become a research hot topic. Core technologies in the automated driving field include intelligent environment awareness, automated navigation positioning, driving behavior decision-making, intelligent path planning control, and the like. The automated driving behavior decision-making technology is an important guarantee for smooth and reliable operation of a self-driving vehicle. Proper evaluation of intelligent driving behavior decision-making is a basis of correct driving behavior decision-making. Further, decision-making of driving behavior and identification of abnormal driving behavior are important components of an automated driving theory. Usually, the abnormal driving behavior includes non-smooth driving behavior such as speeding, abrupt deceleration, abrupt acceleration, and frequent lane changes. Providing a reliable and efficient method for identifying abnormal driving behavior is of great practical significance for improving user driving experience and improving existing driving behavior decision-making.

In many cases, abnormal driving behavior identified in the conventional technology is only suspicious abnormal driving behavior rather than real abnormal driving behavior. Refer to a scenario 100 shown in FIG. 1. Three different scenarios are shown. In a left diagram, there is no other vehicle in a lane of a vehicle 101. If vehicle braking (including abrupt braking) occurs, the braking belongs to abnormal braking behavior. In a middle diagram, a vehicle 102 slowly travels in the front of a lane of a vehicle 101. In this scenario, if vehicle braking (including abrupt braking) occurs, the braking belongs to normal braking behavior. In a right diagram, another vehicle 103 is cut in front of a vehicle 101 at a low vehicle speed. In this scenario, if vehicle braking (including abrupt braking) occurs, the braking belongs to normal braking behavior. It may be learned that in the foregoing three cases, only the first case is real abnormal driving behavior, and the latter two cases are normal braking behavior (to avoid a collision with a front vehicle). However, in the conventional technology, it is considered that all abrupt braking is abnormal driving behavior. In this way, abnormal driving identification is inaccurate.

Based on the foregoing, a new method for identifying abnormal driving behavior is required, to more accurately identify abnormal driving behavior.

SUMMARY

To resolve a problem of low identification accuracy of abnormal driving behavior in the conventional technology, various embodiments of this application provide a method for identifying abnormal driving behavior, a system, anon-transient storage medium, and a vehicle that uses the system. In technical solutions of this application, information data of two aspects, namely, vehicle driving behavior and a vehicle driving scenario, is combined, and it is comprehensively determined, based on at least the data in the two aspects by using algorithm logic that is set for a specific scenario, whether a vehicle is in an abnormal driving state, to resolve a problem that identification of abnormal driving behavior is not accurate enough in the conventional technology.

As an aspect of this application, an embodiment of this application provides a method for identifying abnormal vehicle driving. The method may include: obtaining vehicle driving behavior data by using an electronic control unit (ECU or Electronic Control Unit) or an in-vehicle control system, and determining, based on the vehicle driving behavior data, whether a vehicle is in a state of suspicious abnormal driving behavior; obtaining current vehicle driving scenario data by using an in-vehicle apparatus such as a laser radar, a millimeter wave radar, a camera, or an ultrasonic radar; determining, based on the vehicle driving behavior data and the current vehicle driving scenario data, whether the suspicious abnormal driving behavior is abnormal driving behavior. In the foregoing method, the driving behavior data and the current driving scenario data of the vehicle are combined, and it is determined, based on the two types of information, whether the vehicle is in a state of abnormal driving behavior, to overcome inaccuracy of determining abnormal driving behavior of a vehicle based on only vehicle driving behavior data in the conventional technology, thereby also improving safety performance of automated driving.

In an embodiment, the vehicle driving behavior data may include a vehicle speed, a vehicle acceleration, a vehicle orientation angle, and a lane line deviation value of the vehicle. These pieces of driving behavior data may be directly obtained or indirectly obtained through calculation by using vehicle control parameters, and are direct reflections of vehicle driving behavior. Clustering analysis is performed on the vehicle driving behavior data to obtain (undetermined) abnormal driving behavior. A well-known technical solution such as principal components analysis (PCA), kernel principal components analysis (KPCA), locally linear embedding (LLE), or Laplacian eigenmap (LE) may be used as the clustering analysis.

In an embodiment, the current vehicle driving scenario data includes a vehicle information parameter, an other-vehicle information parameter, a traffic signal parameter, a lane line parameter, and a road information parameter. These pieces of information represent a specific driving scenario in which the vehicle is located. Some of these pieces of data are discrete, and some of these pieces of data are continuous. Discretization processing may be performed on the continuous data, to facilitate subsequent processing and calculation. Current vehicle driving scenario data obtained after the discretization processing is classified by using a neural network, to determine a current driving scenario. The neural network includes at least one of the following: a convolutional neural network (CNN) and an extreme learning machine (ELM).

In an embodiment, the determined current driving scenario includes at least one of the following: intersection deceleration, road section deceleration, and lane line pressing. These several types of scenarios appear at relatively high frequency in actual driving, and in these several types of scenarios, if it is determined, based on only the driving behavior data, whether the vehicle is in an abnormal driving state, erroneous determining is prone to occur.

In an embodiment, after the current driving scenario is determined, algorithm logic corresponding to the current driving scenario is determined based on the current driving scenario. The algorithm logic may be a predetermined rule, or may be correspondingly adjusted based on an actual determining status, to determine whether the vehicle is in a state of abnormal driving behavior in the current driving scenario. Different current driving scenarios corresponding to respective different algorithm logic.

According to a second aspect, an automated driving assistance system is provided, including: a first apparatus configured to obtain vehicle driving behavior data; a second apparatus configured to obtain current vehicle driving scenario data; and a processor communicatively connected to the first apparatus and the second apparatus. The processor is configured to determine, based on the obtained vehicle driving behavior data and current vehicle driving scenario data, whether a vehicle is in an abnormal driving state. The first apparatus may include an electronic control unit (ECU or Electronic Control Unit). The second apparatus may include a laser radar, a millimeter wave radar, an ultrasonic radar, or a digital camera.

It may be understood that the system provided in the second aspect corresponds to the method provided in the first aspect. Therefore, for implementations of the second aspect and achieved technical effects, refer to the related descriptions of the implementations of the first aspect.

According to a third aspect, an intelligent driving vehicle is provided, including the automated driving assistance system according to the second aspect.

According to a fourth aspect, a computer-readable storage medium is provided, including an instruction set. The instruction set may be executed by a processor to implement the method according to any one of the first aspect or the implementations of the first aspect.

The various embodiments of this application provide the method for identifying abnormal driving behavior, the automated driving assistance system, the non-transient storage system, and the intelligent driving vehicle that includes the automated driving assistance system. In the technical solutions of this application, current driving scenario information is introduced to an identification process of abnormal driving behavior of the vehicle, to resolve a problem of misidentification of abnormal driving behavior due to a lack of consideration of driving scenario information in the conventional technology. In addition, in the solutions of this application, a plurality of types of algorithm logic that match specific driving scenarios are set for the specific driving scenarios, and abnormal driving behavior of the vehicle is determined by using a logical operation of an algorithm cluster of the plurality of types of algorithm logic. A person skilled in the art may alternatively properly adjust the algorithm logic based on an actual requirement. Therefore, the technical solutions of this application have good scalability. In addition, a code amount of the algorithm logic in the technical solutions of this application is relatively small. Therefore, the technical solutions of this application may be conveniently directly applied to a vehicle end, and therefore have an economic advantage. In summary, the technical solutions of this application may be widely applied to automated driving solutions, systems, and vehicles of different levels.

BRIEF DESCRIPTION OF DRAWINGS

FIG. 6-1 is a schematic diagram of algorithm logic in a scenario, according to an embodiment of this application;

FIG. 6-2 is a schematic diagram of algorithm logic in a scenario, according to an embodiment of this application;

FIG. 6-3 is a schematic diagram of algorithm logic in a scenario, according to an embodiment of this application;

FIG. 6-4 is a schematic diagram of algorithm logic in a scenario, according to an embodiment of this application;

FIG. 6-5 is a schematic diagram of algorithm logic in a scenario, according to an embodiment of this application;

FIG. 7-1 is a schematic diagram of algorithm logic in a scenario, according to an embodiment of this application;

FIG. 7-2 is a schematic diagram of algorithm logic in a scenario, according to an embodiment of this application;

FIG. 8-1 is a schematic diagram of algorithm logic in a scenario, according to an embodiment of this application;

FIG. 8-2 is a schematic diagram of algorithm logic in a scenario, according to an embodiment of this application;

DESCRIPTION OF EMBODIMENTS

Embodiments of this application provide a method for identifying abnormal driving. A driving scenario (ambient environment information of a vehicle) is introduced to an identification process of abnormal driving behavior, to identify abnormal driving behavior in different scenarios. This provides a new solution for accurately identifying abnormal driving behavior, and provides support for improving automated driving reliability and optimizing user driving experience.

Figure 2:
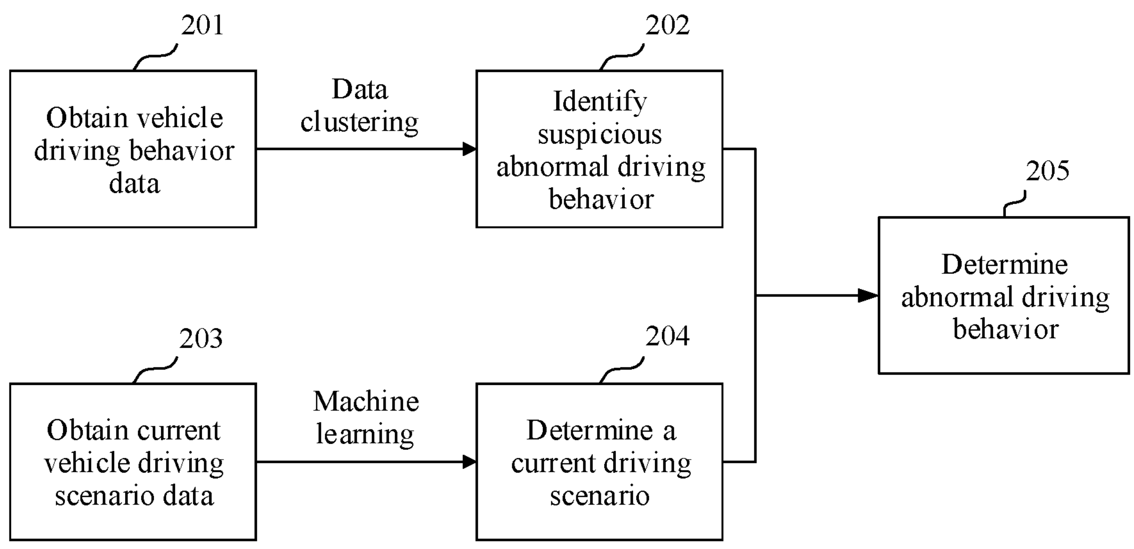
FIG. 2 is a diagram of an architecture for identifying abnormal driving behavior, according to an embodiment of this application.

FIG. 2 is a schematic diagram of a procedure 200 for identifying abnormal driving behavior according to an embodiment of this application. The procedure includes the following steps:

201: Obtain vehicle driving behavior data. The vehicle driving behavior data mainly includes quantifiable vehicle control parameters. The vehicle control parameters may be obtained by an electronic control unit (ECU) or an in-vehicle control system, and the vehicle control parameters include: (1) an abrupt braking behavior parameter: a vehicle acceleration; (2) an abrupt acceleration behavior parameter: a vehicle acceleration; (3) a lane center line deviation value of a vehicle; (4) a vehicle speed lower than or higher than a traffic speed: a vehicle speed; and (5) a turn behavior parameter: a vehicle orientation angle. These pieces of driving behavior data may be directly obtained or indirectly obtained through calculation by using the vehicle control parameters, and are direct reflections of vehicle driving behavior. It should be understood that vehicle driving behavior described herein may include both manual driving and automated driving at various levels (for example, an SAE specification L0 to L5).

202: Analyze the driving behavior data obtained in 201, to identify suspicious abnormal driving behavior. In some embodiments, refer to a procedure 300 shown in FIG. 3. The procedure includes the following steps: Step 301: Obtain driving behavior data. Step 302: Perform data modeling analysis on the obtained driving behavior data, including extracting statistical values such as a mean, a root mean square, a maximum value, a minimum value, a peak value, and a kurtosis factor of the driving behavior data. Step 303: Extract statistical feature values of the driving behavior data. Step 304: Perform clustering analysis on the data obtained in step 303. Step 305: After the data clustering is completed, determine proportions of data volumes of a normal behavior data cluster and a suspicious abnormal behavior data cluster in total clustering data, and determine a boundary between the normal data cluster and the suspicious abnormal driving behavior data cluster. Step 306: Identify suspicious abnormal driving behavior based on a result of step 305. The clustering analysis method may include (but is not limited to): principal components analysis (PCA), kernel principal components analysis (KPCA), locally linear embedding (LLE), or Laplacian eigenmap (LE).

203: Obtain current vehicle driving scenario data. A driving scenario of the vehicle is mainly determined based on ambient environment information of the vehicle. This process mainly relates to five types of information, including: (1) an other-vehicle information parameter, such as a quantity of surrounding other vehicles, an other-vehicle speed, an other-vehicle acceleration, an other-vehicle orientation angle, or other-vehicle lateral and longitudinal position coordinates (including but not limited to these parameters); (2) a vehicle information parameter, such as vehicle lateral and longitudinal position coordinates, or a vehicle orientation angle; (3) a traffic light parameter, such as a red/yellow/green left turn light; (4) a lane line information parameter, such as a lane line position, a lane width, or a lane quantity; and (5) a road information parameter, such as a road type or whether there is an intersection. It should be understood that the current vehicle driving scenario data may be obtained by using an in-vehicle apparatus such as a laser radar, a millimeter wave radar, a camera, or an ultrasound radar. Alternatively, the vehicle may be notified of surrounding vehicle driving scenario data of the vehicle by a control center through communication between the vehicle and the control center; or the vehicle may be notified of surrounding vehicle driving scenario data of the vehicle by another vehicle through communication between the vehicle and the another vehicle. Alternatively, a combination of the foregoing methods is used. This is not limited in this application. Some of the foregoing parameters are continuous parameters, and some of the foregoing parameters are discrete parameters. In some embodiments, discretization processing may be performed on the continuous parameters, to facilitate subsequent identification of a current vehicle driving scenario.

Figure 4:
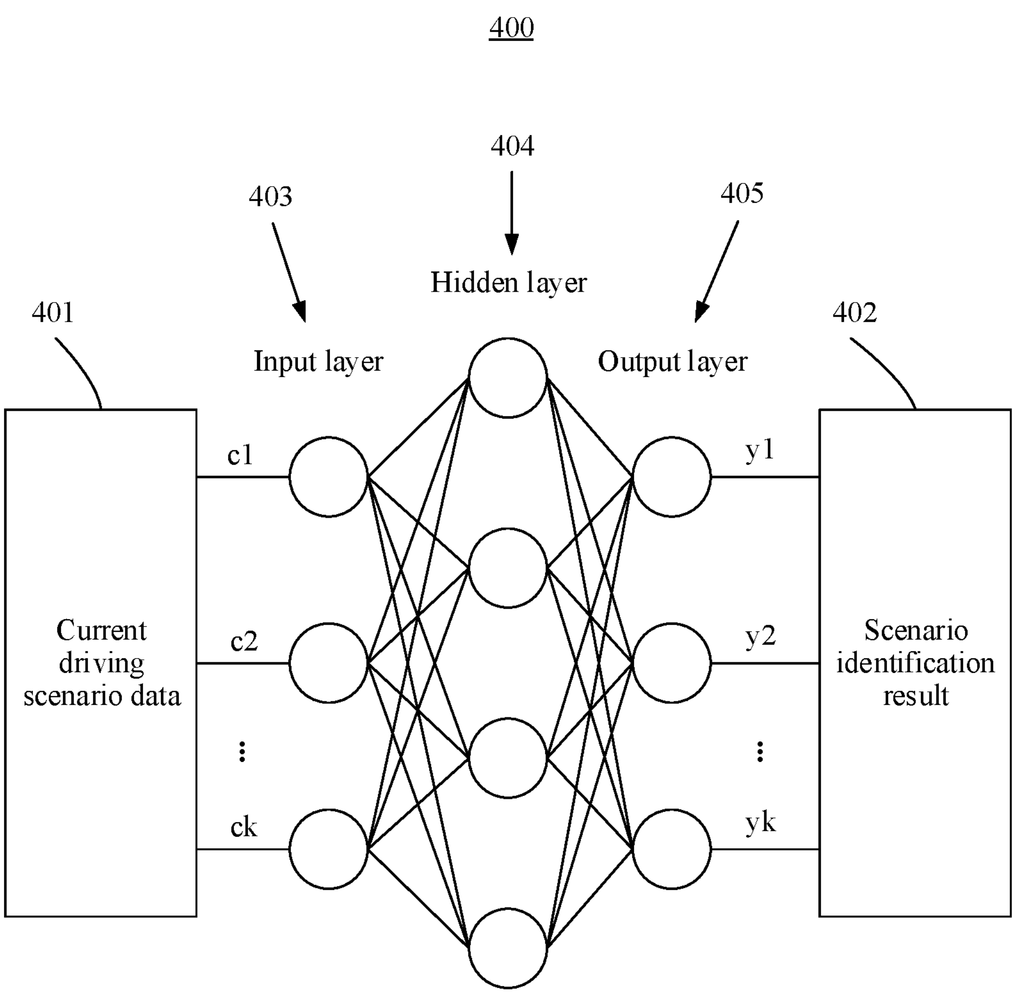
FIG. 4 is a schematic diagram of a neural network used for driving scenario identification according, to an embodiment of this application.

204: After the current vehicle driving scenario data is obtained, identify a vehicle driving scenario based on the current vehicle driving scenario data, so that a specific scenario in which the vehicle is currently located can be determined through driving scenario identification. The determining is, for example, (but not limited to): determining whether the vehicle is located at an intersection, whether there is a vehicle in front of the vehicle, or whether the vehicle is located in a left turn waiting area. In some embodiments, a machine learning method is used to identify the current vehicle driving scenario by using the current vehicle driving scenario data. In some embodiments, a neural network method may be used to identify the vehicle driving scenario. In some embodiments, an extreme learning machine model (ELM) may be used as a neural network. FIG. 4 shows a procedure 400 of identifying a current driving scenario by using an extreme learning machine. The extreme learning machine includes an input layer 403, a hidden layer 404, and an output layer 405. After current vehicle driving scenario data 401 is input to the input layer 403, a classification result (scenario identification result 402) is output through the hidden layer (single layer) 404 and the output layer 405. It should be understood that, the extreme learning machine needs to undergo a training phase before being used. Data of a vehicle in different scenarios is used to train the extreme learning machine, so that the extreme learning machine model can identify different scenarios. The extreme learning machine can be used after completing the training. In some embodiments, the extreme learning machine is trained by using discretized scenario parameters, and values of the discretized scenario parameters are combined into a scenario, for example, the following intersection scenario: (1) there is a vehicle in a front traveling range of a vehicle at an intersection; (2) a U-turn scenario; (3) a vehicle is located in a left turn waiting area or a traffic light is not green; (4) a vehicle enters an intersection at an excessively high speed; or (5) there is an obstacle in a safety range of a vehicle at an intersection. It should be further understood that, although this embodiment provides the extreme learning machine example, any suitable classifier (for example, a convolutional neural network) in the machine learning field can be used to implement driving scenario identification.

205: Perform abnormal driving behavior determining based on at least the identified suspicious abnormal driving behavior and current driving scenario. In other words, the suspicious abnormal driving behavior is not necessarily real abnormal driving behavior, and current driving scenario information of the vehicle needs to be considered. After the current driving scenario information is added, it is determined, based on algorithm logic corresponding to the driving scenario, suspicious abnormal driving behavior that belongs to real abnormal driving behavior, and suspicious abnormal driving behavior that belongs to normal driving behavior.

Figure 5:
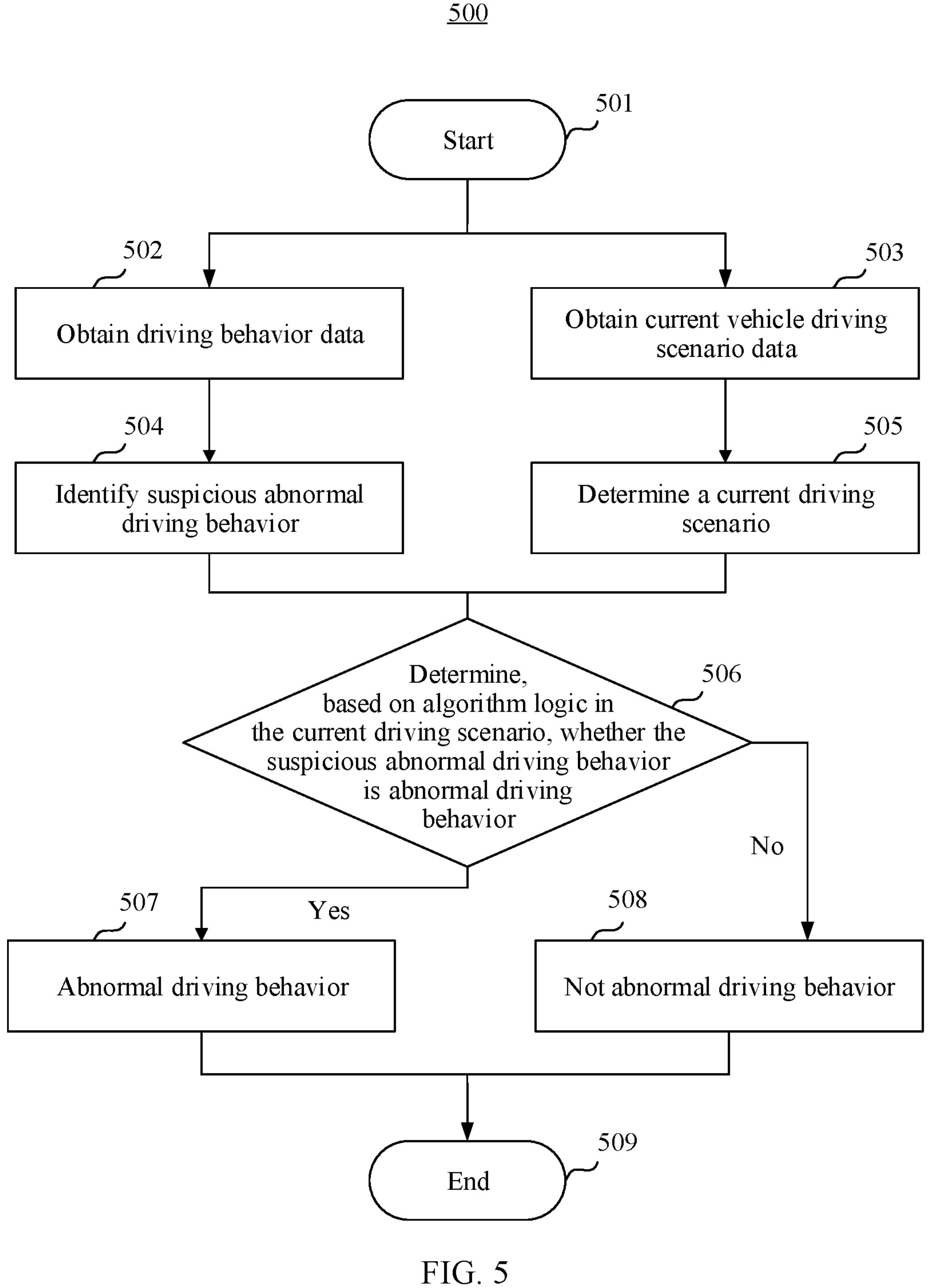
FIG. 5 is a schematic diagram of scenario-based identification of abnormal driving behavior according, to an embodiment of this application.

FIG. 5 is a schematic diagram of a scenario-based identification procedure 500 of abnormal driving behavior according to an embodiment of this application. The procedure includes the following steps:

501: Start.

502: Obtain vehicle driving behavior data.

503: Obtain current vehicle driving scenario data.

504: Identify suspicious abnormal driving behavior based on the vehicle driving behavior data.

505: Identify a current driving scenario based on the current driving scenario data.

506: Determine, based on algorithm and determining logic in the current scenario, whether the suspicious abnormal driving behavior in the current scenario belongs to abnormal driving behavior.

507: Determine abnormal driving behavior in the suspicious abnormal driving behavior based on step 506.

508: Determine normal driving behavior in the suspicious abnormal driving behavior based on step 506.

509: End.

Figure 1:
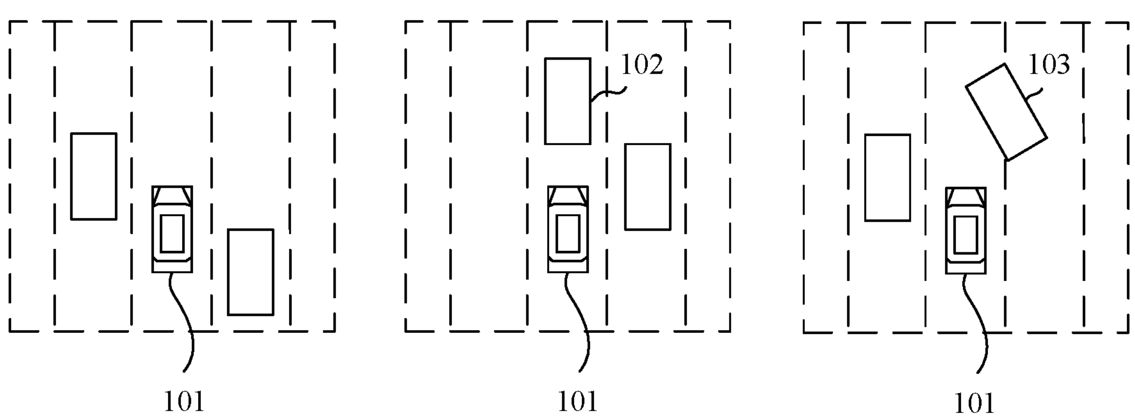
FIG. 1 is a schematic diagram of an application scenario of abnormal driving identification.
Figures 1, 6:
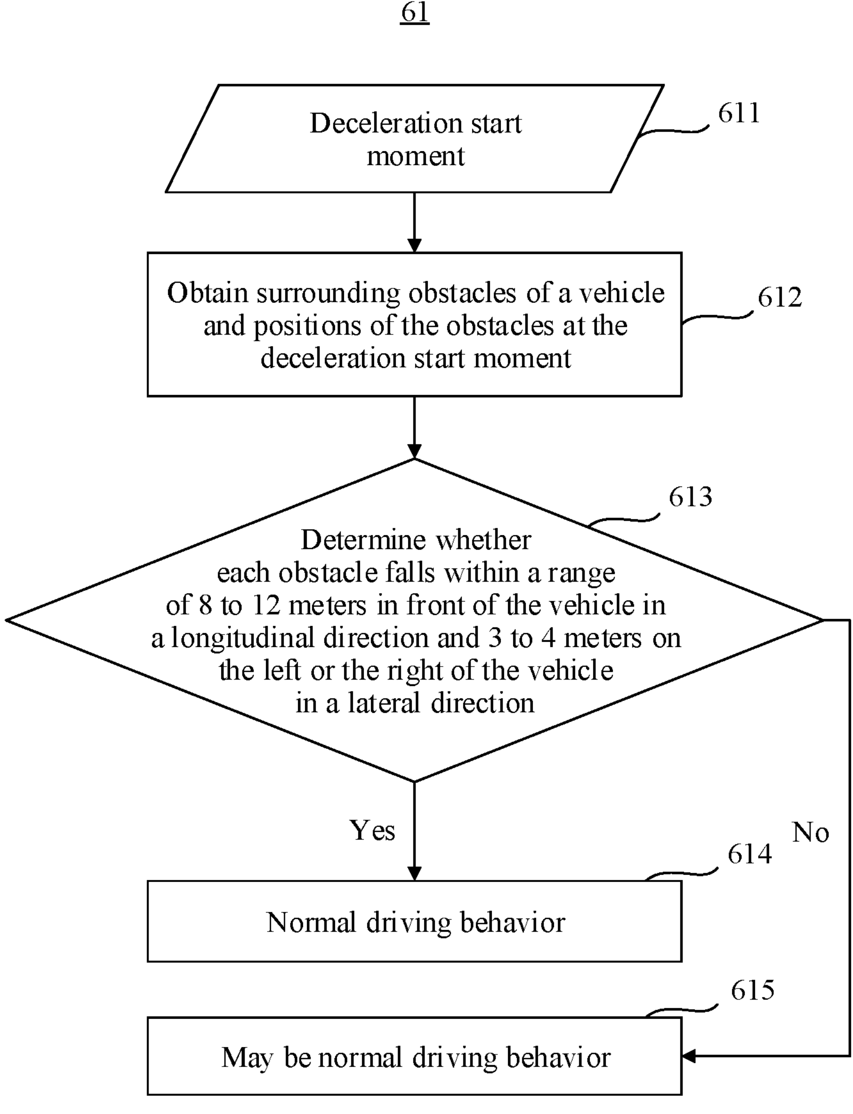
Figure 6:
Figure 2:
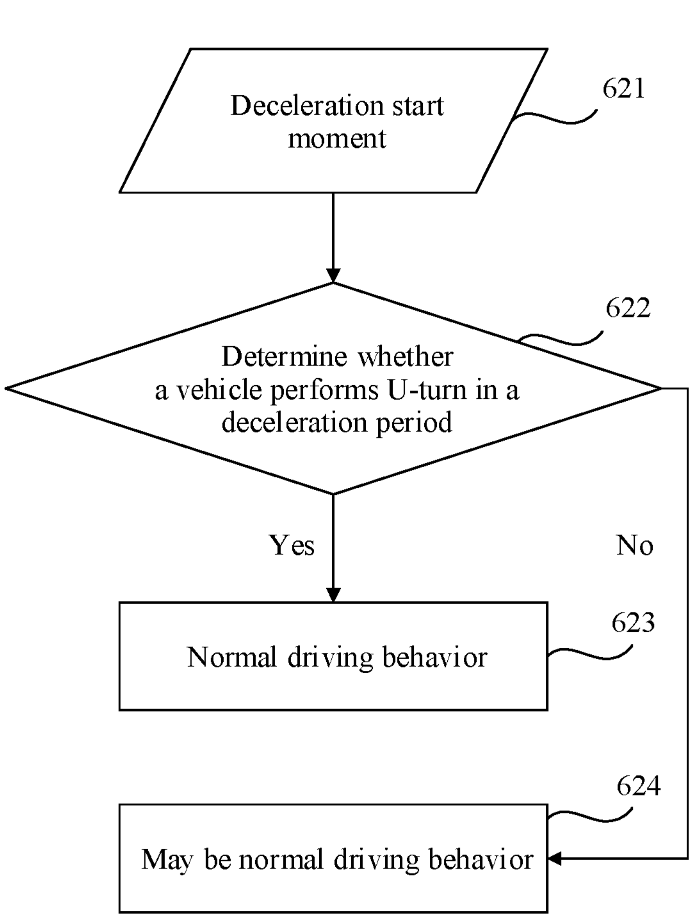
Figures 3, 6:
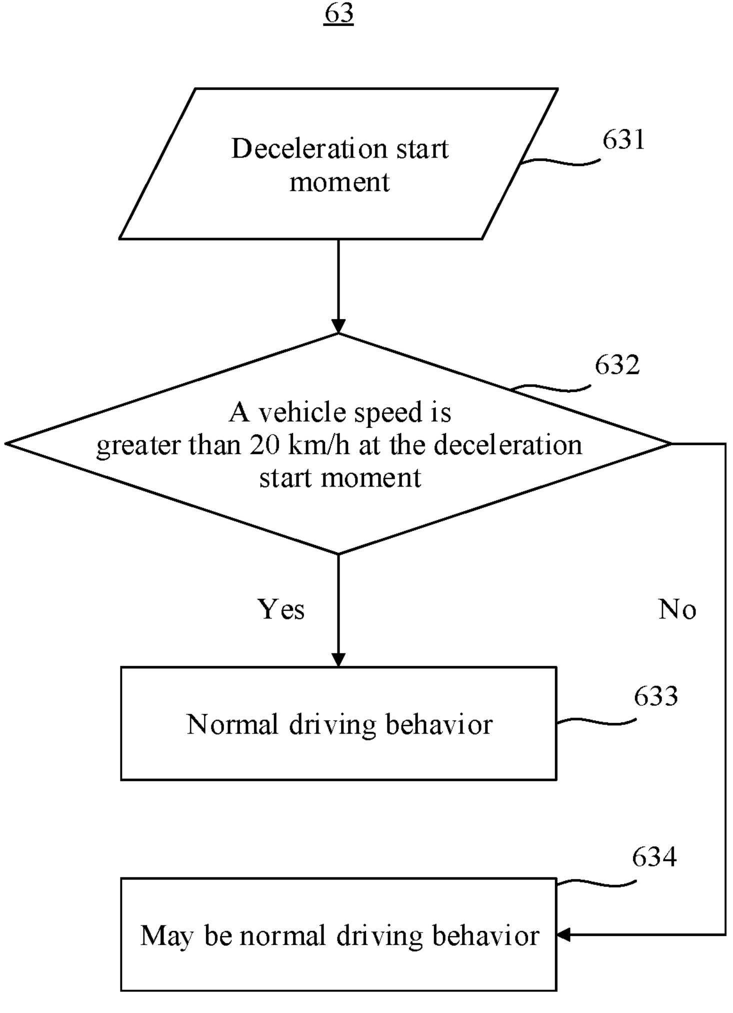
Figures 4, 6:
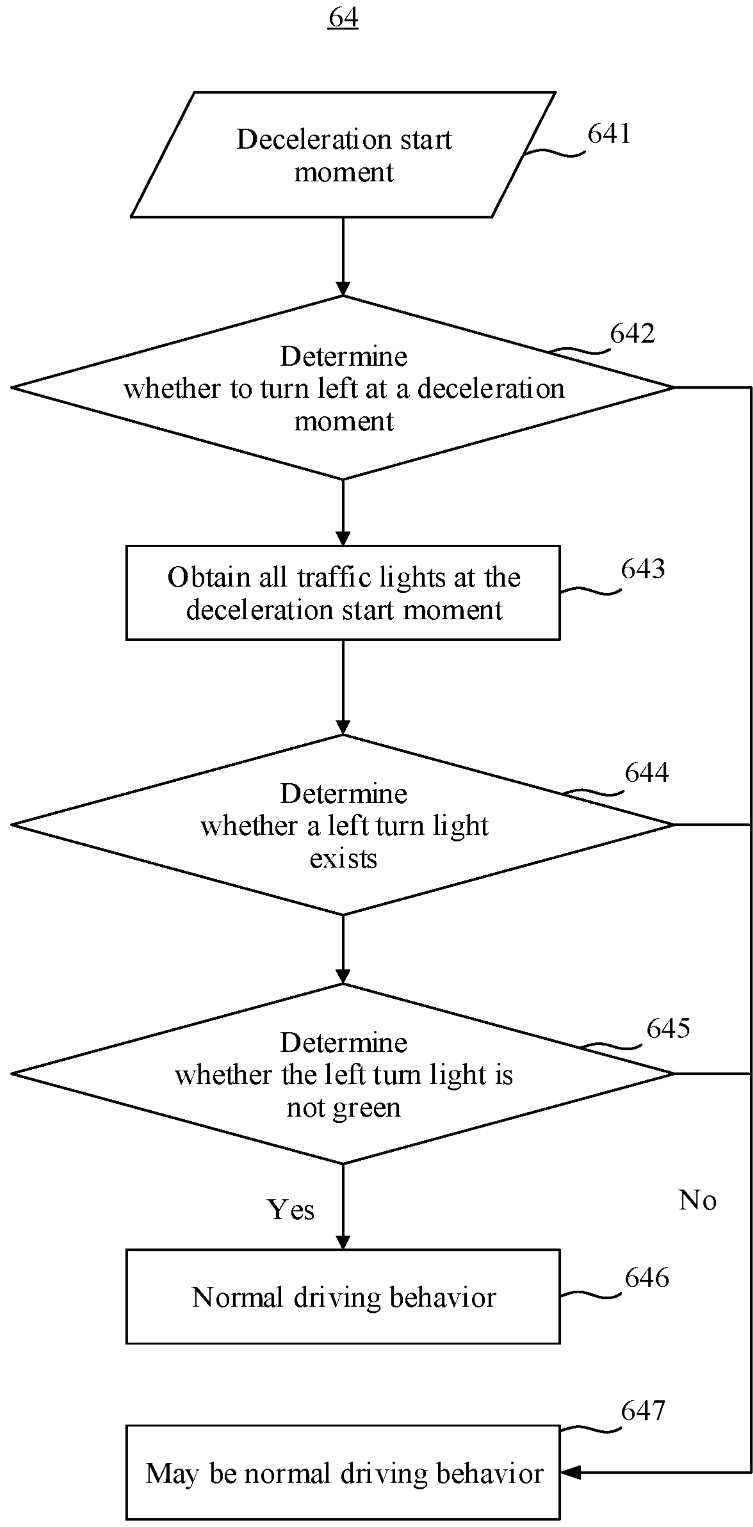
Figures 5, 6:
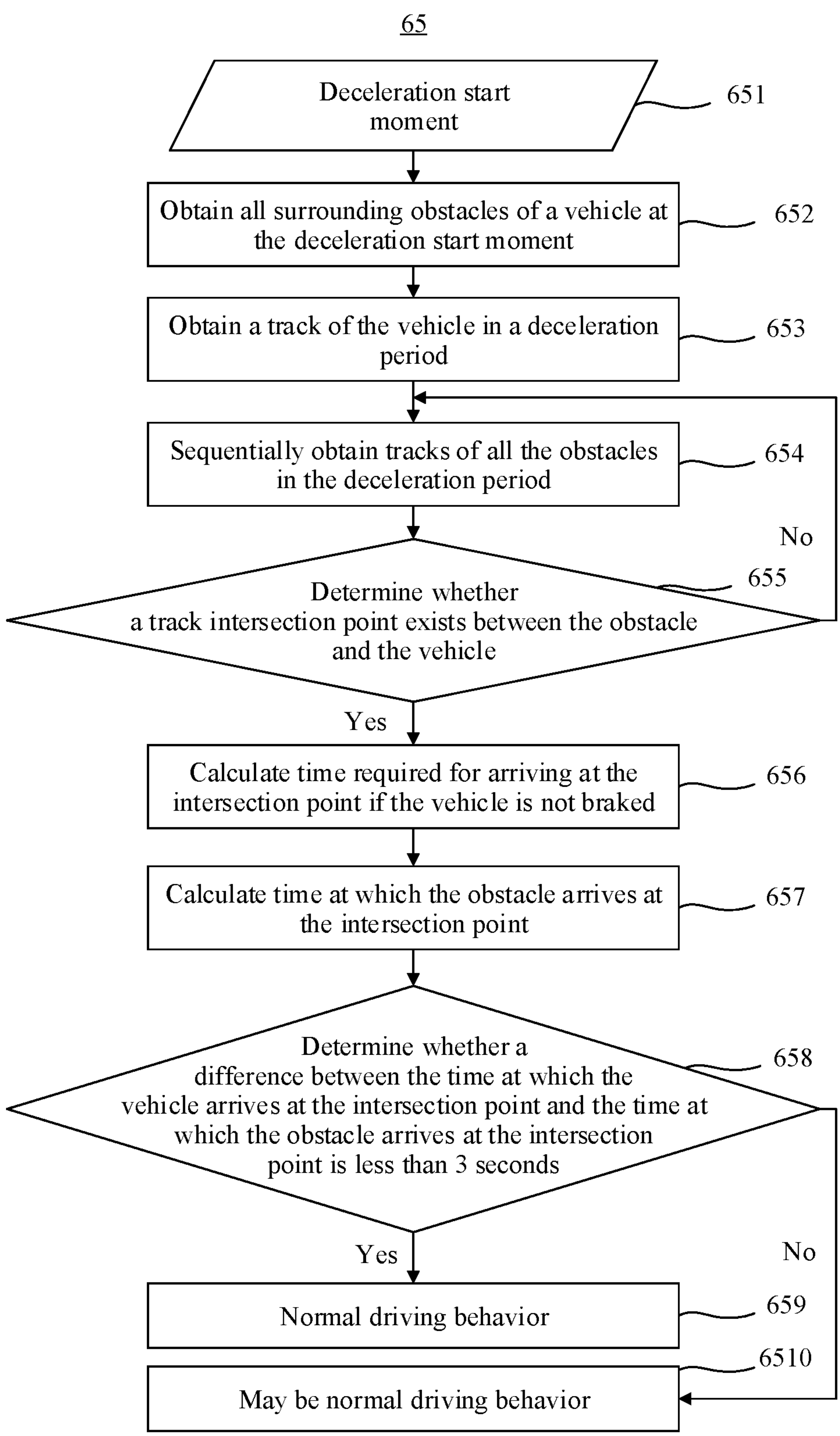

FIG. 6-1 to FIG. 6-5 show identification algorithms and determining logic of abnormal driving behavior (deceleration/braking) in intersection scenarios according to embodiments. Intersection scenario parameters include other-vehicle information (a quantity of other vehicles, an other-vehicle speed, an other-vehicle acceleration, an other-vehicle position relative to a vehicle, an other-vehicle absolute position, or an other-vehicle orientation angle), road information (a zebra crossing, whether there is a turn waiting area, whether there is a U-turn, or a stop line), vehicle information (mainly a vehicle position, a vehicle go-straight/left turn/right turn state, or the like), and traffic light information (such as a color of a go-straight light, remaining time of a go-straight light, a color of a left turn light, or remaining time of a left turn light). In some embodiments, intersection scenarios include the following five types:

(1) there is an obstacle in a front traveling range of a vehicle at an intersection;

(2) a vehicle U-turn scenario;

(3) a vehicle enters an intersection at an excessively high speed;

(4) an intersection scenario 4 in which a vehicle is in a left turn waiting area or a traffic light is not green; and (5) there is an obstacle in a safety range of a vehicle at an intersection.

If a vehicle is decelerated/braked at an intersection and the vehicle is in any one of the foregoing five scenarios, the braking does not belong to abnormal driving behavior but belongs to normal driving behavior.

In some embodiments, an acceleration is used as a behavior parameter of deceleration behavior. If the acceleration is positive, it indicates that the vehicle is in an acceleration state. If the acceleration changes from positive (or 0) to negative, it indicates that the vehicle performs braking deceleration behavior. It should be noted that, in some embodiments, Kalman filtering may be used to filter data in a case in which a vehicle speed changes due to road bumps or a slight change in an accelerator aperture (a speed fluctuation in this case does not indicate real acceleration or deceleration of the vehicle). It should be understood that, in addition to the Kalman filtering, another suitable filtering method or data analysis method may be alternatively used to filter the data that does not indicate real deceleration.

In some embodiments, after acceleration parameter data is obtained, statistical value data such as a mean, a root mean square, a maximum value, a minimum value, a peak value, and a kurtosis factor in the acceleration parameter data is extracted, and feature extraction is performed on these pieces of data; and then clustering analysis is performed on behavior parameter data obtained after the feature extraction. After the data clustering is completed, proportions of data amounts of a normal behavior data cluster and a suspicious abnormal behavior data cluster in total clustering data are determined, and a boundary between the normal data cluster and the suspicious abnormal braking behavior data cluster is determined, to identify suspicious braking driving behavior.

In some embodiments, a trained extreme learning machine may be used to identify, by using vehicle driving scenario data, a specific intersection scenario in which a vehicle is currently located. The vehicle driving scenario data may include processed discretized data.

The following describes in detail algorithms and determining logic in the five intersection scenarios with reference to FIG. 6-1 to FIG. 6-5.

FIG. 6-1 shows algorithm logic 61 of a vehicle in the foregoing scenario (1) according to an embodiment. The algorithm logic includes the following steps:

611: Obtain deceleration start moment data. When the vehicle is braked, clustering analysis is performed on vehicle driving behavior data by using, for example, the foregoing principal components analysis (PCA), kernel principal components analysis (KPCA), locally linear embedding (LLE), or Laplacian eigenmap (LE), so that suspicious abnormal driving behavior can be identified, and a start moment at which the vehicle is decelerated can be obtained.

612: Obtain surrounding obstacles of the vehicle and positions of the obstacles at the deceleration start moment. These pieces of information may be obtained by using an in-vehicle apparatus such as a laser radar, a millimeter wave radar, an ultrasound radar, or a camera. Alternatively, the vehicle may be notified of surrounding obstacle information of the vehicle by a control center through communication between the vehicle and the control center; or the vehicle may be notified of surrounding obstacle information of the vehicle by another vehicle through communication between the vehicle and the another vehicle. Alternatively, a combination of the foregoing methods is used. This is not limited in this application. The obstacle may include (but is not limited to): a vehicle, a pedestrian, an animal, a roadblock, or any other object/person/animal that is on a lane and that may hinder driving.

613: Determine whether each obstacle falls within a range of 8 to 12 meters in front of the vehicle in a longitudinal direction and 3 to 4 meters on the left or the right of the vehicle in a lateral direction. The range belongs to an area that the vehicle is to pass soon when traveling along an existing route, and may be referred to as a collision area. In other words, if there is an obstacle in the collision area and the vehicle is not braked, a collision is very likely to occur soon. Obstacle identification in the collision area range may be implemented based on an apparatus such as an ultrasonic radar, a millimeter wave radar, or an ultrasonic radar.

614: If a determining result of 613 is yes, it indicates that there is an obstacle in the collision area in front of the vehicle, and if the vehicle is not braked, a collision is very likely to occur soon. Therefore, in this case, it can be determined that deceleration/braking of the vehicle does not belong to abnormal driving behavior, in other words, belongs to normal driving behavior.

615: If a determining result of 613 is no, it indicates that there is no obstacle in the collision area in front of the vehicle. In this case, deceleration/braking may be abnormal driving behavior, or may be normal driving behavior. In this case, a driving state of the vehicle is to be determined, and a final result can be obtained only by performing determining in all the foregoing five scenarios.

Further, FIG. 6-2 shows algorithm logic 62 of a vehicle in the foregoing scenario (2) according to an embodiment. The algorithm logic includes the following steps:

621: Obtain deceleration start moment data. When the vehicle is braked, clustering analysis is performed on vehicle driving behavior data by using, for example, the foregoing principal components analysis (PCA), kernel principal components analysis (KPCA), locally linear embedding (LLE), or Laplacian eigenmap (LE), so that suspicious abnormal driving behavior can be identified, and a start moment at which the vehicle is decelerated/braked can be obtained.

622: Determine whether the vehicle performs turn behavior (a U-turn) in a vehicle deceleration period. This may be obtained by obtaining and analyzing driving data obtained starting from the deceleration start moment.

623: If a determining result of 622 is yes, it indicates that the vehicle performs turn behavior starting from the deceleration start moment. A turn (U-turn) of a vehicle is usually necessarily accompanied with deceleration. Therefore, in this case, it can be determined that deceleration/braking of the vehicle does not belong to abnormal driving, in other words, belongs to normal driving behavior.

624: If a determining result of 624 is no, it indicates that the vehicle performs no turn starting from the deceleration moment. In this case, deceleration/braking may be abnormal driving behavior, or may be normal driving behavior. In this case, a driving state of the vehicle is to be determined, and a final result can be obtained only by performing determining in all the foregoing five scenarios.

Figure 3:
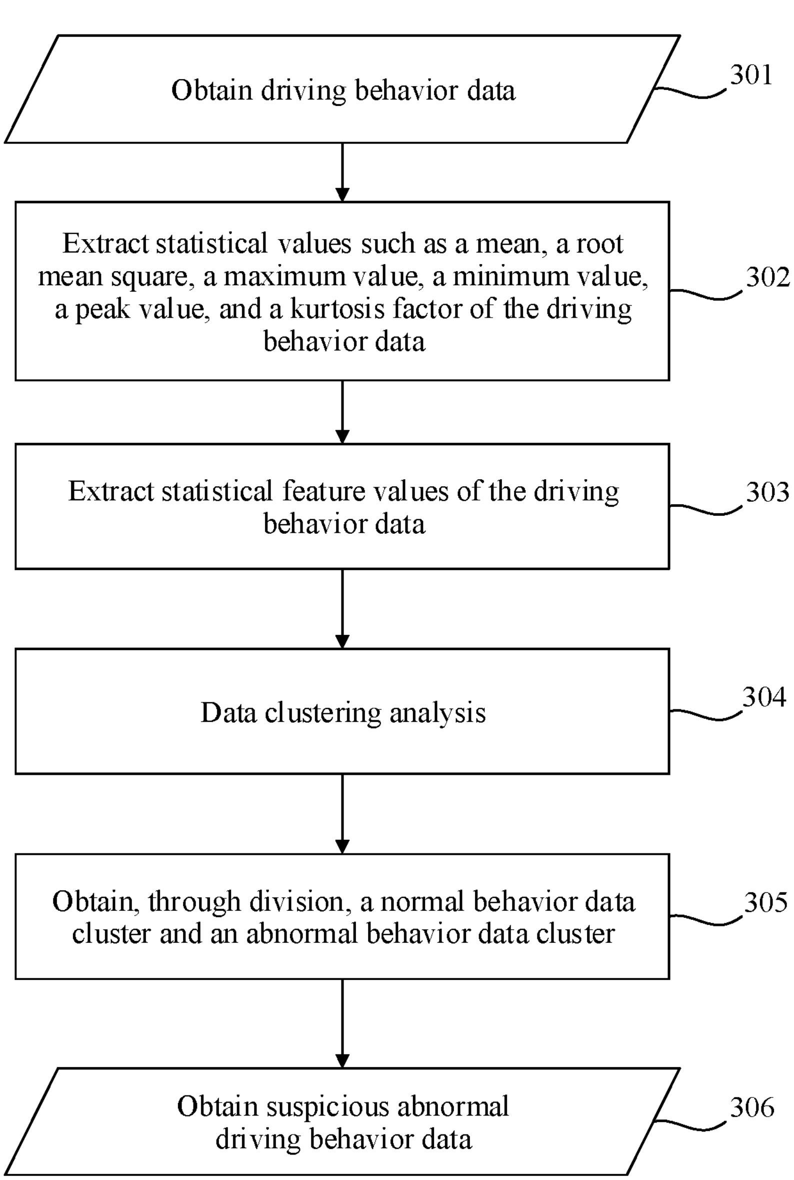
FIG. 3 is a schematic diagram of a procedure for identifying suspicious abnormal driving behavior, according to an embodiment of this application.

Further, FIG. 6-3 shows algorithm logic 63 of a vehicle in the foregoing scenario (3) according to an embodiment. The algorithm logic includes the following steps:

631: Obtain deceleration start moment data. When the vehicle is braked, clustering analysis is performed on vehicle driving behavior data by using, for example, the foregoing principal components analysis (PCA), kernel principal components analysis (KPCA), locally linear embedding (LLE), or Laplacian eigenmap (LE), so that suspicious abnormal driving behavior can be identified, and a start moment at which the vehicle is decelerated/braked can be obtained.

632: Determine whether a speed of the vehicle is greater than 20 km/h at the deceleration start moment. It should be understood that 20 km/h herein is a value given based on some embodiments, and a person skilled in the art may properly adjust this value based on an actual requirement, without violating the concept of this application.

633: If a determining result of 632 is yes, it indicates that the vehicle enters an intersection at a relatively high speed. According to a common principle, if a vehicle enters an intersection at an excessively high speed, the vehicle usually should be braked. Therefore, in this case, it can be determined that braking of the vehicle does not belong to abnormal driving, in other words, belongs to normal driving behavior.

634: If a determining result of 633 is no, it indicates that the vehicle enters an intersection at a relatively low speed. According to a common principle, in this case, the vehicle does not need to be braked when entering the intersection. Therefore, in this case, deceleration/braking of the vehicle may be abnormal driving behavior, or may be normal driving behavior. In this case, a driving state of the vehicle is to be determined, and a final result can be obtained only by performing determining in all the foregoing five scenarios.

Further, FIG. 6-4 shows algorithm logic 64 of a vehicle in the foregoing scenario (4) according to an embodiment. The algorithm logic includes the following steps:

641: Obtain deceleration start moment data. When the vehicle is braked, clustering analysis is performed on vehicle driving behavior data by using, for example, the foregoing principal components analysis (PCA), kernel principal components analysis (KPCA), locally linear embedding (LLE), or Laplacian eigenmap (LE), so that suspicious abnormal driving behavior can be identified, and a start moment at which the vehicle is decelerated/braked can be obtained.

642: Determine whether the vehicle performs a left turn at the deceleration occurrence moment.

643: If a determining result of 642 is yes, continue to obtain all traffic light information at the deceleration start moment in this step.

644: Determine whether a left turn light exists.

645: If a determining result of 644 is yes, continue to determine whether the left turn light is not green.

646: If a determining result of 645 is yes, it indicates that the vehicle is accompanied with a traffic signal of a left turn red light at the moment at which the vehicle is decelerated at the intersection. According to a common principle, the vehicle should be braked. Therefore, in this case, it can be determined that braking of the vehicle does not belong to abnormal driving, in other words, belongs to normal driving behavior.

647: If any one of determining results of 642, 644, and 645 is no, it indicates that the vehicle is in one of the following three cases at the moment at which the vehicle is decelerated at an intersection: (1) no left turn occurs; (2) a left turn occurs but there is no left turn light; and (3) a left turn occurs, and there is a left turn light and the left turn light is green. The three cases are usually not necessarily accompanied with deceleration. Therefore, in this case, deceleration/braking of the vehicle may be abnormal driving behavior, or may be normal driving behavior. In this case, a driving state of the vehicle is to be determined, and a final result can be obtained only by performing determining in all the foregoing five scenarios.

Further, FIG. 6-5 shows algorithm logic 65 of a vehicle in the foregoing scenario (5) according to an embodiment. The algorithm logic includes the following steps:

651: Obtain deceleration start moment data. When the vehicle is braked, clustering analysis is performed on vehicle driving behavior data by using, for example, the foregoing principal components analysis (PCA), kernel principal components analysis (KPCA), locally linear embedding (LLE), or Laplacian eigenmap (LE), so that suspicious abnormal driving behavior can be identified, and a start moment at which the vehicle is decelerated/braked can be obtained.

652: Obtain surrounding obstacles of the vehicle and positions of the obstacles at the deceleration start moment. These pieces of information may be obtained by using an in-vehicle apparatus such as a laser radar, a millimeter wave radar, an ultrasound radar, or a camera. Alternatively, the vehicle may be notified of surrounding obstacle information of the vehicle by a control center through communication between the vehicle and the control center; or the vehicle may be notified of surrounding obstacle information of the vehicle by another vehicle through communication between the vehicle and the another vehicle. Alternatively, a combination of the foregoing methods is used. This is not limited in this application. The obstacle may include (but is not limited to): a vehicle, a pedestrian, an animal, a roadblock, or any other object/person/animal that is on a lane and that may hinder driving.

653: Obtain a traveling track of the vehicle in a deceleration period. This may be obtained by obtaining and analyzing vehicle driving data obtained starting from the deceleration start moment.

654: Sequentially obtain tracks of all the obstacles in the vehicle deceleration period. This is, for example, (but not limited to): if the first to-be-analyzed obstacle is a vehicle, obtaining a track of the vehicle in the vehicle deceleration period.

655: Determine whether a track intersection point exists between the obstacle and the vehicle. The example in which the obstacle is a vehicle is still used. It is determined, based on the vehicle track (a track 1) obtained in 653 and the vehicle track (a track 2) obtained in 654, whether an intersection point (including an extension intersection point) exists between the track 1 and the track 2. The two tracks may be analyzed and determined in a common earth coordinate system. If a determining result of 655 is no, that is, there is no intersection point between the tracks of the vehicle and the obstacle, it indicates that there is no possibility that the vehicle collides with the obstacle, and the logic returns to the previous step 654 to continue to obtain a next obstacle (may be, for example, a riding bicycle) for analysis. In some embodiments, the obstacle may be detected by using, for example, a laser radar, a millimeter wave radar, an ultrasound radar, or a combination thereof, and time at which the obstacle passes through an intersection point may be determined. In some other embodiments, time at which the vehicle passes through the intersection point is determined by selecting driving data of the vehicle between two times of braking. It should be noted that, if the obstacle is stationary, for example, a roadblock, in this case, a track of the roadblock is a stationary point (in terms of using the earth coordinate system as a reference system). Therefore, this case is equivalent to the scenario (there is an obstacle in a front traveling range of a vehicle at an intersection) to which the determining logic 61 is applicable.

656: If a determining result of 655 is yes, that is, there is a track intersection point between the vehicle track and the obstacle track, continue to calculate time required for arriving at the intersection point if the vehicle is not braked (starting from the deceleration occurrence moment). The time may be denoted as T, and T may be calculated by using the following parameters: a track length S (vehicle track length between a vehicle track point at the deceleration occurrence moment and the intersection point), an instant speed V of the vehicle at the deceleration occurrence moment, and an instant acceleration $a_0$ of the vehicle at a neighboring moment before the deceleration occurrence moment. For example, if the vehicle starts to be decelerated at a moment $T_c$, and $T_c$ is 12:05:10 (12:05:10), a neighboring moment $T_{c-1}$ before the moment $T_c$ may be 12:05:09 (12:05:09), and an acceleration of the vehicle at this moment is set to $a_0$. Because $T_c$ is the deceleration start moment, the acceleration $a_0$ at the moment $T_{c-1}$ is necessarily a non-negative value. If $a_0$ is positive, T may be calculated according to a kinematics formula $S=V*T+½a*T^2$. T is added to the deceleration start moment, to obtain time T1 at which the vehicle arrives at the intersection point if the vehicle is not braked. For example, if the deceleration occurrence moment is 12:05:10 (12:05:10), and the time required for arriving at the intersection point if the vehicle is not braked starting from the deceleration occurrence moment is 10 seconds, T1 is 12:05:20 (12:05:20). It should be understood that, in some embodiments, time precision is calculated in a unit of second. However, a person skilled in the art may properly adjust time unit precision based on an actual case, without violating the spirit of this application. It should be further understood that, in the foregoing embodiment, T is calculated by using a uniform acceleration motion formula. Alternatively, T may be calculated by using a uniform motion formula (that is, the acceleration of the vehicle at the neighboring moment before the deceleration occurrence moment is 0), or T may be estimated/predicted by using a data statistics or machine learning method. A person skilled in the art may properly select, based on an actual case, a solution for obtaining T, without violating the spirit of this application.

657: After 656, obtain, through calculation, time at which the obstacle arrives at the intersection point. The time may be denoted as T2.

658: Determine whether a difference between the time at which the vehicle arrives at the intersection point and the time at which the obstacle arrives at the intersection point, namely, a time difference between T1 and T2, is less than 3 seconds. Herein, 3 seconds are selected as a safety time difference. If the vehicle and the obstacle pass through the intersection point at a time difference of at least 3 seconds, it is considered that the vehicle is safe; otherwise, it is considered that the vehicle is unsafe, that is, the vehicle may collide with the obstacle. It should be understood that 3 seconds herein are a value determined based on some embodiments, and a person skilled in the art may properly adjust this value based on an actual requirement, without violating the concept of this application.

659: If a determining result of 658 is yes, it indicates that the vehicle and the obstacle arrive at the intersection point in a safety time difference range. In this case, if the vehicle is not braked, there is a relatively large possibility that the vehicle collides with the obstacle. According to a common principle, the vehicle should be braked to avoid a collision. Therefore, in this case, it can be determined that braking of the vehicle does not belong to abnormal driving, in other words, belongs to normal driving behavior.

6510: If a determining result of 658 is no, it indicates that the vehicle and the obstacle reach the intersection point outside the safety time difference range. In this case, there is a very small possibility that the vehicle collides with the obstacle. According to a common principle, the vehicle does not need to be braked. Therefore, in this case, braking may be abnormal braking, or may be normal braking. In this case, a traveling state of the vehicle is to be determined, and a final result can be obtained only by performing determining in all the foregoing five scenarios.

The foregoing describes the five specific intersection scenarios and the algorithm logic 61 to 65 sequentially corresponding to the five scenarios. In an embodiment, for any algorithm logic, there is branch logic of determining that braking is "normal braking" and branch logic of determining that braking "may belong to normal braking". In any algorithm logic, if it is finally determined that the braking "belongs to normal braking", it may be directly determined that the braking of the vehicle does not belong to abnormal driving behavior, in other others, belongs to normal driving behavior. For the five types of branch logic of determining that braking "may belong to normal braking", "may belong to normal braking" can be ruled out only by executing a union of the algorithm logic 61 to 65, and then it is determined that the braking is "abnormal braking". For example, in an intersection scenario, if suspicious braking occurs, a vehicle system runs all the foregoing algorithm logic 61 to 65. If it is temporarily determined that the braking "may belong to normal braking" in the branch 615 of the algorithm logic 61, the system continues to perform determining based on the algorithm logic 62 to 65. If all branch logic results obtained in the algorithm logic 62 to 65 are "may belong to normal brake", it may be determined that in the intersection scenario, deceleration/braking of the vehicle does not belong to any one of the foregoing five scenarios. Therefore, it can be determined that the braking belongs to abnormal driving behavior.

It should be understood that, although the five specific intersection scenarios are described in the foregoing embodiment solutions, a person skilled in the art may properly adjust a quantity of intersection scenarios in a specific case, without violating the spirit of this application.

Figures 1, 7:
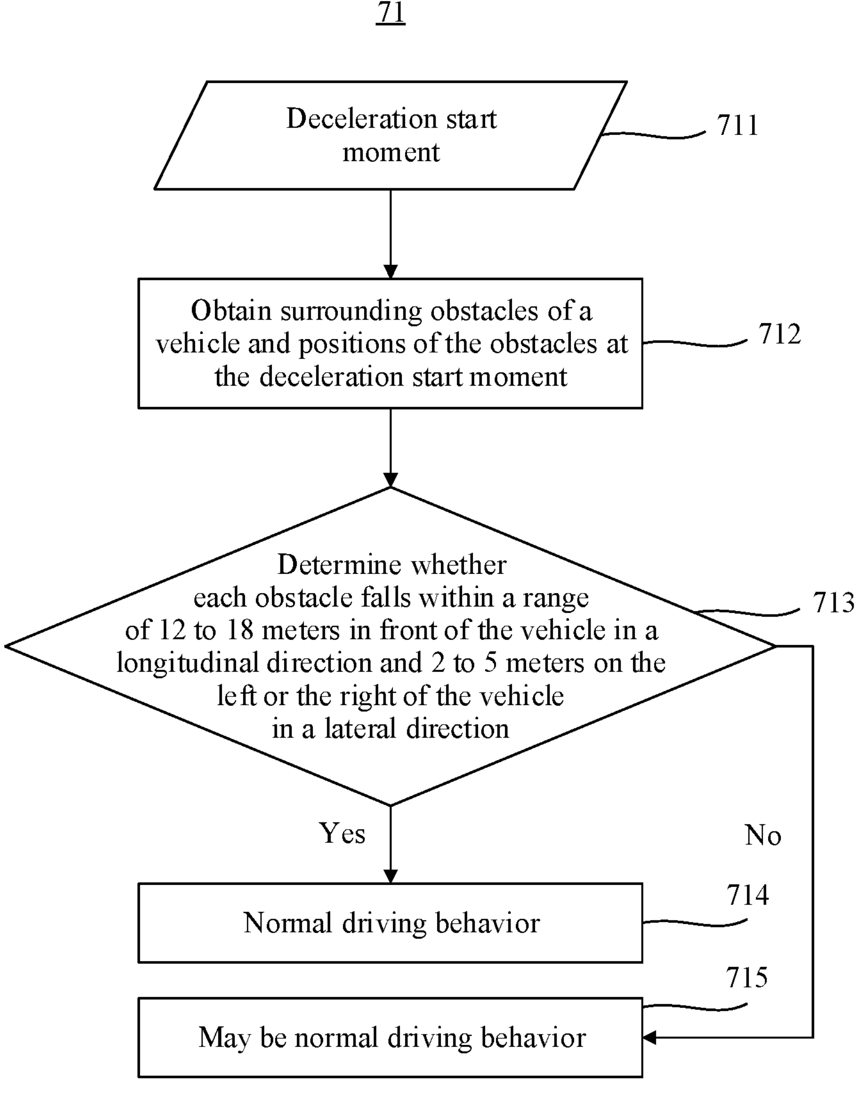
Figures 2, 7:
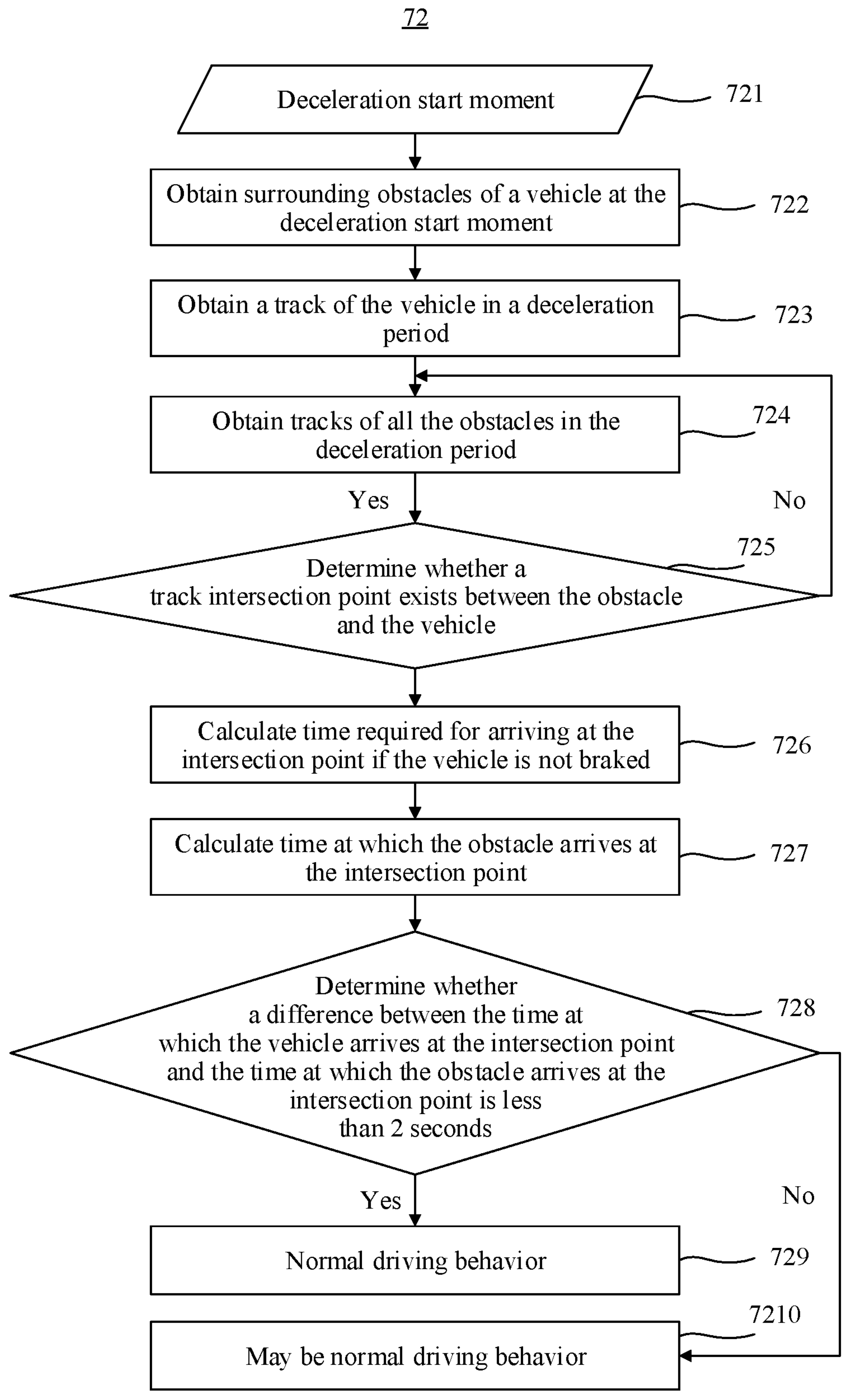

FIG. 7-1 and FIG. 7-2 show algorithm logic for determining abnormal driving behavior (braking) in road section scenarios according to embodiments.

In some embodiments, the following two road section scenarios are considered:

there is an obstacle in a front traveling range of a vehicle; and there is an obstacle in a safety range of a vehicle.

FIG. 7-1 shows algorithm logic 71 of a vehicle in the foregoing scenario (1) according to an embodiment. The algorithm logic includes the following steps:

711: Obtain deceleration start moment data. When the vehicle is braked, clustering analysis is performed on vehicle driving behavior data by using, for example, the foregoing principal components analysis (PCA), kernel principal components analysis (KPCA), locally linear embedding (LLE), or Laplacian eigenmap (LE), so that suspicious abnormal driving behavior can be preliminarily identified, and a start moment at which the vehicle is decelerated can be obtained.

712: Obtain surrounding obstacles of the vehicle and positions of the obstacles at the deceleration start moment. These pieces of information may be obtained by using an in-vehicle apparatus such as a laser radar, a millimeter wave radar, a camera, or an ultrasound radar. Alternatively, the vehicle may be notified of surrounding obstacle information of the vehicle by a control center through communication between the vehicle and the control center; or the vehicle may be notified of surrounding obstacle information of the vehicle by another vehicle through communication between the vehicles. Alternatively, a combination of the foregoing methods is used. This is not limited in this application. The obstacle may include (but is not limited to): a vehicle, a pedestrian, a roadblock, or any other object that is on a lane and that may hinder driving.

713: Determine whether each obstacle falls within a range of 12 to 18 meters in front of the vehicle in a longitudinal direction and 2 to 5 meters on the left or the right of the vehicle in a lateral direction. The range belongs to an area that the vehicle is to pass soon when traveling along an existing route, and may be referred to as a collision area. In other words, if there is an obstacle in the collision area and the vehicle is not braked, a collision is very likely to occur soon. Obstacle identification in the collision area range may be implemented based on an apparatus such as an ultrasonic radar, a millimeter wave radar, or an ultrasonic radar. Further, compared with the branch 613 in the algorithm logic 61, it may be learned that the collision area in the branch 713 is wider and deeper than the collision area in the branch 613 in terms of range, for the following reason: A traveling speed of a vehicle in a road scenario is usually higher than that in an intersection scenario, and therefore a wider and deeper collision area needs to be set to adapt to the road scenario. It should be further understood that, range selection of the collision area is performed based on some embodiments, and a person skilled in the art may properly change a width and a depth of the collision area based on an actual requirement, without violating the idea of this application.

714: If a determining result of 713 is yes, it indicates that there is an obstacle in the collision area in front of the vehicle, and if the vehicle is not braked, a collision is very likely to occur soon. Therefore, in this case, it can be determined that braking of the vehicle does not belong to abnormal driving behavior, in other words, belongs to normal driving behavior.

715: If a determining result of 713 is no, it indicates that there is no obstacle in the collision area in front of the vehicle. In this case, braking may be abnormal driving behavior, or may be normal driving behavior. In this case, a traveling state of the vehicle is to be determined, and a final result can be obtained only by performing determining in all the foregoing two scenarios.

FIG. 7-2 shows algorithm logic 72 of a vehicle in the foregoing scenario (2) according to an embodiment. The algorithm logic includes the following steps:

721: Obtain deceleration start moment data. When the vehicle is braked, clustering analysis is performed on vehicle driving behavior data by using, for example, the foregoing principal components analysis (PCA), kernel principal components analysis (KPCA), locally linear embedding (LLE), or Laplacian eigenmap (LE), so that suspicious abnormal driving behavior can be preliminarily identified, and a start moment at which the vehicle is decelerated can be obtained.

722: Obtain surrounding obstacles of the vehicle and positions of the obstacles at the deceleration start moment. These pieces of information may be obtained by using an in-vehicle apparatus such as a laser radar, a millimeter wave radar, an ultrasound radar, or a camera. Alternatively, the vehicle may be notified of surrounding obstacle information of the vehicle by a control center through communication between the vehicle and the control center; or the vehicle may be notified of surrounding obstacle information of the vehicle by another vehicle through communication between the vehicle and the another vehicle. Alternatively, a combination of the foregoing methods is used. This is not limited in this application. The obstacle may include (but is not limited to): a vehicle, a pedestrian, an animal, a roadblock, or any other object/person/animal that is on a lane and that may hinder driving.

723: Obtain a traveling track of the vehicle in a deceleration period. This may be obtained by obtaining and analyzing driving data obtained starting from the deceleration start moment.

724: Sequentially obtain tracks of all the obstacles in the vehicle deceleration period. This is, for example, (but not limited to): if the first to-be-analyzed obstacle is a vehicle, obtaining a track of the vehicle in the vehicle deceleration period.

725: Determine whether a track intersection point exists between the obstacle and the vehicle. The example in which the obstacle is a vehicle is still used. It is determined, based on the vehicle track (a track 1) obtained in 653 and the vehicle track (a track 2) obtained in 724, whether an intersection point (including an extension intersection point) exists between the track 1 and the track 2. The two tracks may be analyzed and determined in a common earth coordinate system. If a determining result of 725 is no, that is, there is no intersection point between the tracks of the vehicle and the obstacle, it indicates that there is no possibility that the vehicle collides with the obstacle, and the logic returns to the previous step 654 to continue to obtain a next obstacle (may be, for example, a riding bicycle) for analysis. In some embodiments, the obstacle may be detected by using, for example, a laser radar, a millimeter wave radar, an ultrasound radar, or a combination thereof, and time at which the obstacle passes through an intersection point may be determined. In some other embodiments, time at which the vehicle passes through the intersection point is determined by selecting driving data of the vehicle between two times of braking. It should be noted that, if the obstacle is stationary, for example, a roadblock, in this case, a track of the roadblock is a stationary point (in terms of using the earth coordinate system as a reference system). Therefore, this case is equivalent to the scenario (there is an obstacle in a front traveling range of a vehicle on a road section) to which the determining logic 71 is applicable.

726: If a determining result of 725 is yes, that is, there is a track intersection point between the vehicle track and the obstacle track, continue to calculate time required for arriving at the intersection point if the vehicle is not braked (starting from the deceleration occurrence moment). The time may be denoted as T, and T may be calculated by using the following parameters: a track length S (vehicle track length between a vehicle track point at the deceleration occurrence moment and the intersection point), an instant speed V of the vehicle at the deceleration occurrence moment, and an instant acceleration $a_0$ of the vehicle at a neighboring moment before the deceleration occurrence moment. For example, if the vehicle starts to be decelerated at a moment $T_c$, and $T_e$ is 12:05:10 (12:05:10), a neighboring moment $T_{c-1}$ before the moment $T_c$ may be 12:05:09 (12:05:09), and an acceleration of the vehicle at this moment is set to $a_0$. Because $T_e$ is the deceleration start moment, the acceleration $a_0$ at the moment $T_{c-1}$ is necessarily a non-negative value. If $a_0$ is positive, T may be calculated according to a kinematics formula $S=V*T+½a*T^2$. T is added to the deceleration start moment, to obtain time T1 at which the vehicle arrives at the intersection point if the vehicle is not braked. For example, if the deceleration occurrence moment is 12:05:10 (12:05:10), and the time required for arriving at the intersection point if the vehicle is not braked starting from the deceleration occurrence moment is 10 seconds, T1 is 12:05:20 (12:05:20). It should be understood that, in some embodiments, time precision is calculated in a unit of second. However, a person skilled in the art may properly adjust time unit precision based on an actual case, without violating the spirit of this application. It should be further understood that, in the foregoing embodiment, T is calculated by using a uniform acceleration motion formula. Alternatively, T may be calculated by using a uniform motion formula (that is, the acceleration of the vehicle at the neighboring moment before the deceleration occurrence moment is 0), or T may be estimated/predicted by using a data statistics or machine learning method. A person skilled in the art may properly select, based on an actual case, a solution for obtaining T, without violating the spirit of this application.

727: After 726, continue to calculate time at which the obstacle arrives at the intersection point. The time may be denoted as T2.

728: After 727, determine whether a difference between the time at which the vehicle arrives at the intersection point and the time at which the obstacle arrives at the intersection point, namely, a time difference between T1 and T2, is less than 2 seconds. Herein, 2 seconds are selected as a safety time difference. If the vehicle and the obstacle pass through the intersection point at a time difference of at least 2 seconds, it is considered that the vehicle is safe; otherwise, it is considered that the vehicle is unsafe, that is, the vehicle may collide with the obstacle. It should be understood that 2 seconds herein are a value determined based on some embodiments, and a person skilled in the art may properly adjust this value based on an actual requirement, without violating the concept of this application. Further, compared with the branch 658 in the algorithm logic 65, it may be learned that the time difference (2 s) in the branch 728 is less than the time difference (3 s) in the branch 658, for the following reason: A traveling speed of a vehicle in a road scenario is usually higher than that in an intersection scenario, and therefore a shorter safety time difference needs to be set to adapt to the road scenario.

729: If a determining result of 728 is yes, it indicates that the vehicle and the obstacle arrive at the intersection point in a safety time difference range. That is, if the vehicle is not braked, there is a relatively large possibility that the vehicle collides with the obstacle. According to a common principle, the vehicle should be braked to avoid a collision. In this case, it can be determined that braking of the vehicle does not belong to abnormal driving, in other words, belongs to normal driving behavior.

7210: If a determining result of 728 is no, it indicates that the vehicle and the obstacle reach the intersection point outside the safety time difference range. In this case, there is a very small possibility that the vehicle collides with the obstacle. According to a common principle, the vehicle does not need to be braked. Therefore, in this case, braking may be abnormal driving behavior, or may be normal driving behavior. In this case, a traveling state of the vehicle is to be determined, and a final result can be obtained only by performing determining in all the foregoing five scenarios.

The foregoing describes the two specific road section scenarios and the algorithm logic 71 and 72 sequentially corresponding to the two scenarios. In an embodiment, for any algorithm logic, there is branch logic of determining that braking is "normal braking" and branch logic of determining that braking "may belong to normal braking". In any algorithm logic, if it is finally determined that the braking "belongs to normal braking", it may be directly determined that the braking of the vehicle does not belong to abnormal driving behavior, in other others, belongs to normal driving behavior. For the two types of branch logic of determining that braking "may belong to normal braking", "may belong to normal braking" can be ruled out only by executing a union of the algorithm logic 71 and 72, and then it is determined that the braking is "abnormal braking". For example, in an intersection scenario, if suspicious braking occurs, a vehicle system runs all the foregoing algorithm logic 71 and 72. If it is temporarily determined that the braking "may belong to normal braking" in the branch 715 of the algorithm logic 71, the system continues to perform determining based on the algorithm logic 72. If a branch logic result obtained in the algorithm logic 72 is "may belong to normal brake", it may be determined that in the intersection scenario, deceleration/braking of the vehicle does not belong to either of the foregoing two scenarios. Therefore, it can be determined that the braking belongs to abnormal driving behavior.

It should be understood that, although the two specific road section scenarios are described in the foregoing embodiment solutions, a person skilled in the art may properly adjust a quantity of road scenarios in a specific case, without violating the spirit of this application.

Figures 1, 8:
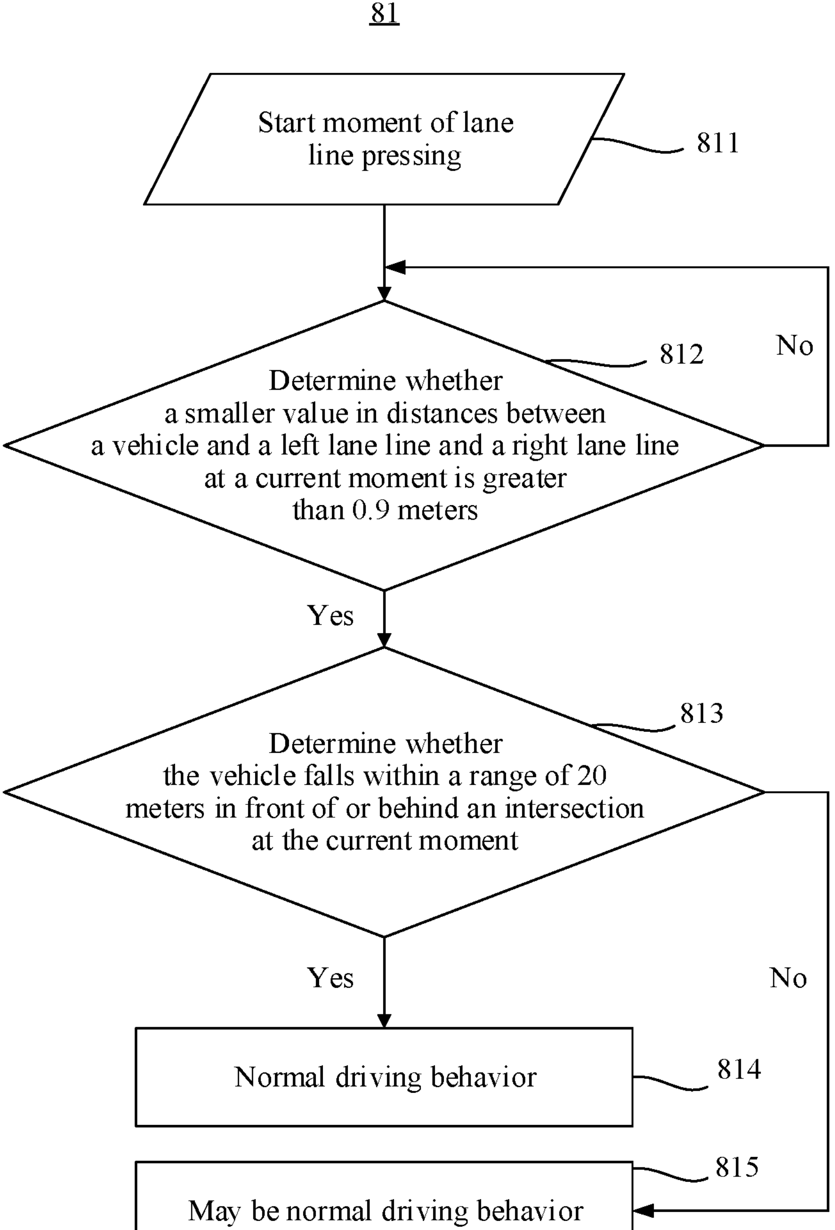
Figure 8:
Figure 2:
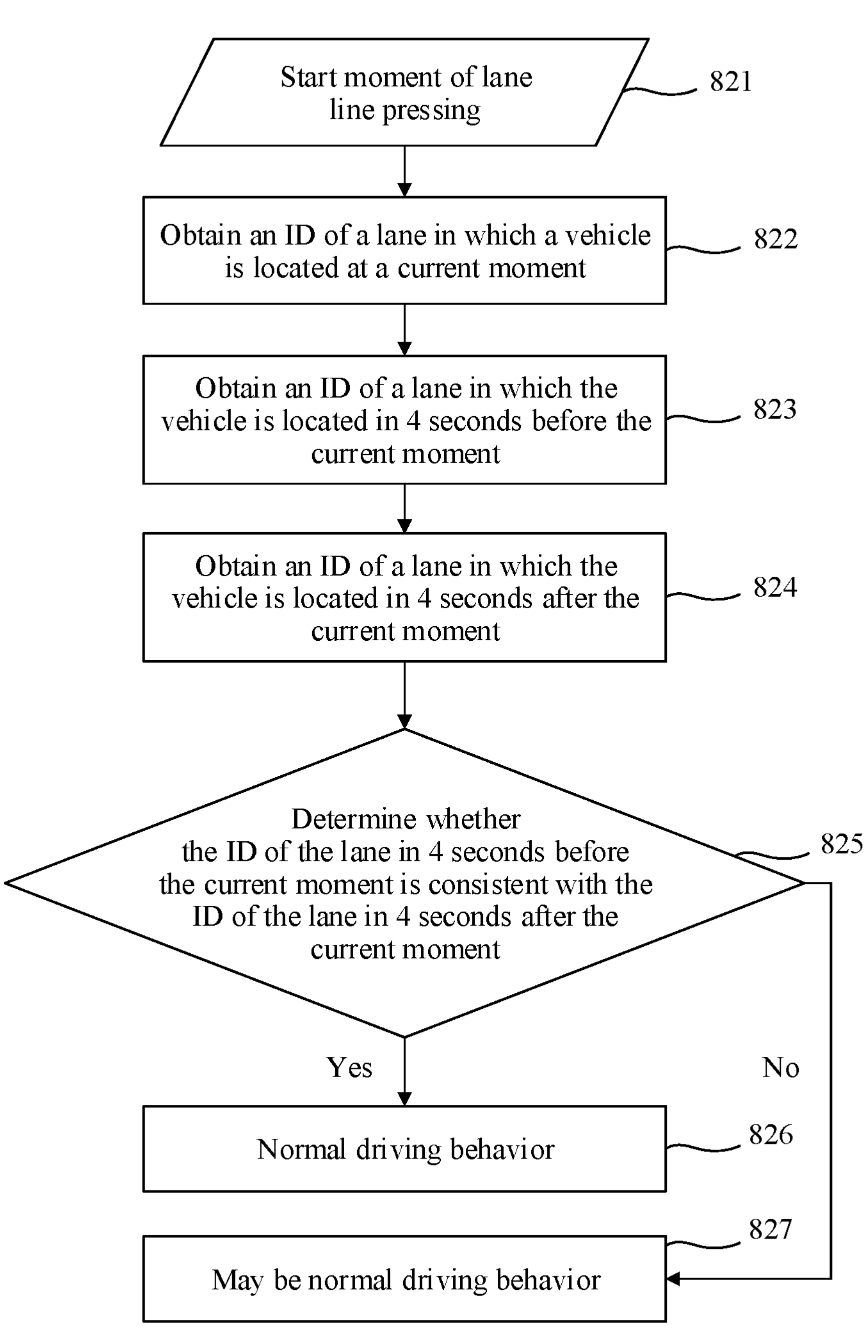

FIG. 8-1 and FIG. 8-2 show algorithm logic for determining abnormal driving behavior (lane line pressing) in road scenarios according to embodiments.

In some embodiments, the following two road section scenarios are considered:

(1) a vehicle passes through an intersection during traveling; and (2) a vehicle changes a lane.

In some embodiments, a lane center line deviation value of a vehicle is used as a behavior parameter of lane line pressing behavior. A value of the parameter is determined based on a value of a distance from a rear axle center point of the vehicle to a left or right lane line.

In some embodiments, after the lane center line deviation value of the vehicle is obtained, statistical value data such as a mean, a root mean square, a maximum value, a minimum value, a peak value, and a kurtosis factor in the lane center line deviation value data of the vehicle is extracted, and then feature extraction is performed on the data; and then clustering analysis is performed on behavior parameter data obtained after the feature extraction. After the data clustering is completed, based on experience, proportions of data amounts of a normal behavior data cluster and a suspicious abnormal behavior data cluster in total clustering data are determined, and a boundary between the normal data cluster and the suspicious abnormal lane line pressing behavior data cluster is determined, to identify suspicious lane line pressing driving behavior.

In some embodiments, a trained extreme learning machine may be used to identify, by using vehicle driving scenario data, a specific road scenario in which a vehicle is currently located.

FIG. 8-1 shows algorithm logic 81 of a vehicle in the foregoing scenario (1) according to an embodiment. The algorithm logic includes the following steps:

811: Obtain start moment data of lane line pressing. When the vehicle presses a lane line, clustering analysis is performed on vehicle driving behavior data by using, for example, the foregoing principal components analysis (PCA), kernel principal components analysis (KPCA), locally linear embedding (LLE), or Laplacian eigenmap (LE), so that suspicious abnormal driving behavior can be preliminarily identified, and a start moment at which the vehicle presses the lane line can be obtained.

812: Determine whether a smaller value in distances between the vehicle and a left lane line and a right lane line at a current moment is greater than 0.9 meters; and if a determining result is no, continue to return to obtain data at a next moment for determining.

813: If a determining result of 812 is yes, because a width of a common household vehicle is at most 1.8 meters, if a distance between a center of the vehicle and the left or right lane line is less than 0.9 meters, it indicates a relatively large probability that the vehicle has been pressed the lane line (a distance between a rear axle center point of the vehicle and the lane line is less than half a width of the vehicle). It should be understood that 0.9 meters herein is a value selected in some embodiments, and a person skilled in the art may properly adjust the value based on different vehicle types, without violating the spirit of this application. In 813, it is further determined whether the vehicle falls within a range of 20 meters in front of or behind an intersection at the current moment.

814: If a determining result of 813 is yes, logic of 812 and 813 indicates that the lane line pressing behavior of the vehicle is accompanied with a case in which the vehicle passes through the intersection, and in the logical branch 813, it is determined whether the vehicle is currently at a relatively large deviation from the lane center line. Usually, when a vehicle passes through an intersection, a lane change (lane line pressing) is large probability behavior. If the vehicle turns left or right at the intersection, both a lane and a direction change. If the vehicle goes straight through the intersection, there is also a relatively large probability that the lane of the vehicle changes after the vehicle passes through the intersection. Therefore, in summary, in this case, lane line pressing behavior does not belong to abnormal driving behavior, but belongs to normal driving behavior.

815: If a determining result of 813 is no, it indicates that the vehicle presses the lane line but does not pass through an intersection. Therefore, in this case, lane line pressing behavior may belong to abnormal driving behavior, or may be normal driving behavior. In this case, a traveling state of the vehicle is to be determined, and a final result can be obtained only by performing determining in all the foregoing two scenarios.

FIG. 8-2 shows algorithm logic 82 of a vehicle in the foregoing scenario (2) according to an embodiment. The algorithm logic includes the following steps:

821: Obtain moment data of lane line pressing behavior of the vehicle. When the vehicle presses a lane line, clustering analysis is performed on vehicle driving behavior data by using, for example, the foregoing principal components analysis (PCA), kernel principal components analysis (KPCA), locally linear embedding (LLE), or Laplacian eigenmap (LE), so that suspicious abnormal driving behavior can be preliminarily identified, and a start moment at which the vehicle presses the lane line can be obtained.

822: Obtain an ID of a lane in which the vehicle is located at a current moment.

823: Obtain an ID of a lane in which the vehicle is located in 4 seconds before the current moment.

824: Obtain an ID of a lane in which the vehicle is located in 4 seconds after the current moment.

825: Determine whether the ID of the lane in 4 seconds before the current moment is consistent with the ID of the lane in 4 seconds after the current moment.

826: If a determining result of 825 is yes, it indicates that the vehicle changes a lane in 4 seconds before the current moment and 4 seconds after the current moment. Because the lane change is necessarily accompanied with lane line pressing, in this case, lane line pressing behavior does not belong to abnormal driving behavior, but belongs to normal driving behavior.

827: If a determining result of 828 is no, it indicates that the vehicle does not change a lane in 4 seconds before the current moment and 4 seconds after the current moment. Therefore, in this case, lane line pressing behavior may be abnormal driving behavior, or may be normal driving behavior. In this case, a driving state of the vehicle is to be determined, and a final result can be obtained only by performing determining in all the foregoing two scenarios.

It should be understood that, although in this embodiment, lane information of the vehicle is obtained by obtaining a lane ID, and it is determined, based on this, whether the vehicle changes a lane, a person skilled in the art may alternatively obtain the lane information in another suitable manner. For example, the lane information of the vehicle may be obtained by using image information and a machine learning method.

The foregoing describes the two specific lane line pressing scenarios and the algorithm logic 81 and 82 sequentially corresponding to the two scenarios. In this embodiment, for any algorithm logic, there is branch logic of determining that lane line pressing "belongs to normal lane line pressing" and branch logic of determining that lane line pressing"may belong to normal lane line pressing". For the two types of branch logic of determining that lane line pressing "may belong to normal lane line pressing", "may belong to normal braking" can be ruled out only by executing a union of the algorithm logic 81 and 82, and then it is determined that the lane line pressing is "abnormal braking". In some embodiments, in a road scenario, if suspicious lane line pressing occurs, a system runs all the foregoing algorithm logic 81 to 85. If it is temporarily determined that the lane line pressing "may belong to normal lane line pressing" in the branch 815 of the algorithm logic 81, the system continues to perform determining based on the algorithm logic 82. If a branch logic result obtained in the algorithm logic 82 is "may belong to normal lane line pressing", it may be determined that in the road scenario, lane line pressing does not belong to either of the foregoing two scenarios. Therefore, it can be determined that the lane line pressing belongs to abnormal driving behavior.

Figures 9, 10:
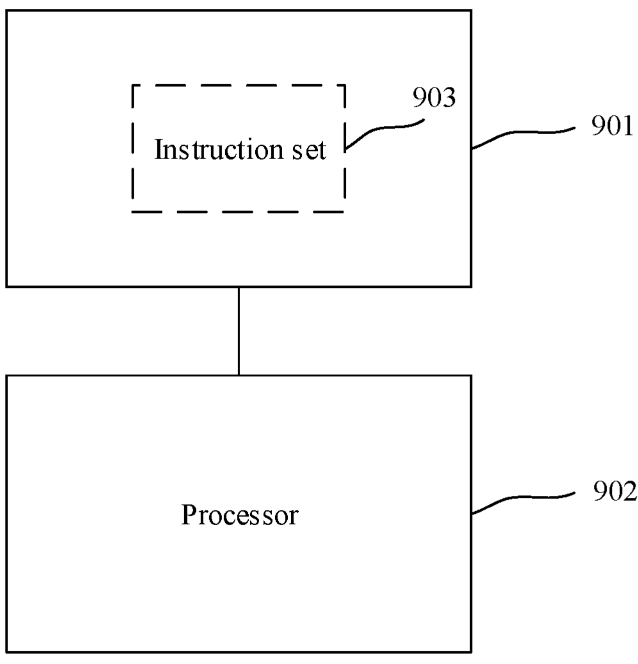
FIG. 9 is a schematic diagram of a non-transient storage medium, according to an embodiment of this application.
FIG. 10 is a schematic diagram of an automated driving assistance system, according to an embodiment of this application.

In some embodiments, referring to FIG. 9, a computer-readable storage medium 901 is provided, including an instruction set 903. The instruction set 903 may be executed by a processor 902 to: obtain vehicle driving behavior data; obtain vehicle driving scenario data; and execute the foregoing algorithm logic 61 to 65, 71 and 72, or 81 and 82 to determine whether a vehicle is in an abnormal driving state.

In some embodiments, referring to FIG. 10, an automated driving assistance system is provided. The automated driving assistance system includes: a first apparatus 1001 configured to obtain vehicle driving behavior data; a second apparatus 1002 configured to obtain current vehicle driving scenario data; and a processor communicatively connected to the first apparatus and the second apparatus.

The first apparatus 1001 may include but is not limited to: an electronic control unit ECU, an in-vehicle sensor, an in-vehicle control system, or the like. The vehicle driving behavior data mainly includes quantifiable vehicle control parameters. The vehicle control parameters may be obtained by an electronic control unit ECU or an in-vehicle control system, and the vehicle control parameters include: (1) an abrupt braking behavior parameter: a vehicle acceleration; (2) an abrupt acceleration behavior parameter: a vehicle acceleration; (3) a lane center line deviation value of a vehicle; (4) a vehicle speed lower than or higher than a traffic speed: a vehicle speed; and (5) a turn behavior parameter: a vehicle orientation angle. These pieces of driving behavior data may be directly obtained or indirectly obtained through calculation by using the vehicle control parameters, and are direct reflections of vehicle driving behavior. It should be understood that vehicle driving behavior described herein may include both manual driving and automated driving at various levels (for example, an SAE specification L0 to L5).

The second apparatus may include but is not limited to: a laser radar, a millimeter wave radar, a camera, an ultrasound radar, a communication apparatus, or the like. The current vehicle driving scenario data mainly includes: (1) an other-vehicle information parameter, such as a quantity of surrounding other vehicles, an other-vehicle speed, an other-vehicle acceleration, an other-vehicle orientation angle, or other-vehicle lateral and longitudinal position coordinates (including but not limited to these parameters); (2) a vehicle information parameter, such as vehicle lateral and longitudinal position coordinates, or a vehicle orientation angle; (3) a traffic light parameter, such as a red/yellow/green left turn light; (4) a lane line information parameter, such as a lane line position, a lane width, or a lane quantity; and (5) a road information parameter, such as a road type or whether there is an intersection. It should be understood that the vehicle driving scenario data may be obtained by using the foregoing in-vehicle apparatus such as a laser radar, a millimeter wave radar, a camera, or an ultrasound radar. Alternatively, based on a communication apparatus, the vehicle may be notified of surrounding driving scenario data of the vehicle by a control center through communication between the vehicle and the control center; or the vehicle may be notified of surrounding driving scenario data of the vehicle by another vehicle through communication between the vehicle and the another vehicle. Alternatively, a combination of the foregoing methods is used. This is not limited in this application. Some of the foregoing parameters are continuous parameters, and some of the foregoing parameters are discrete parameters. In some embodiments, discretization processing may be performed on the continuous parameters, to facilitate subsequent identification of a driving scenario.

The processor determines, based on at least the obtained vehicle driving behavior data and current vehicle driving scenario data, whether the vehicle is in a state of abnormal driving behavior. In some embodiments, the processor may determine, based on the vehicle driving behavior data, the current vehicle driving scenario data, and algorithm logic 61 to 65, 71 and 72, or 81 and 82, whether the vehicle is in a state of abnormal driving behavior.

In some embodiments, an intelligent driving vehicle is provided, including an automated driving assistance system. The automated driving assistance system includes: a first apparatus 1001 configured to obtain vehicle driving behavior data; a second apparatus 1002 configured to obtain current vehicle driving scenario data; and a processor 1003 communicatively connected to the first apparatus and the second apparatus.

The first apparatus 1001 may include but is not limited to: an electronic control unit ECU, an in-vehicle sensor, an in-vehicle control system, or the like. The driving behavior data mainly includes quantifiable vehicle control parameters. The vehicle control parameters may be obtained by an electronic control unit (ECU) or an in-vehicle control system, and the vehicle control parameters include: (1) an abrupt braking behavior parameter: a vehicle acceleration; (2) an abrupt acceleration behavior parameter: a vehicle acceleration; (3) a lane center line deviation value of a vehicle; (4) a vehicle speed lower than or higher than a traffic speed: a vehicle speed; and (5) a turn behavior parameter: a vehicle orientation angle. These pieces of driving behavior data may be directly obtained or indirectly obtained through calculation by using the vehicle control parameters, and are direct reflections of vehicle driving behavior. It should be understood that vehicle driving behavior described herein may include both manual driving and automated driving at various levels (for example, an SAE specification L0 to L5).

The second apparatus 1002 may include but is not limited to: a laser radar, a millimeter wave radar, a camera, an ultrasound radar, a communication apparatus, or the like. The current driving scenario data mainly includes: (1) an other-vehicle information parameter, such as a quantity of surrounding other vehicles, an other-vehicle speed, an other-vehicle acceleration, an other-vehicle orientation angle, or other-vehicle lateral and longitudinal position coordinates (including but not limited to these parameters); (2) a vehicle information parameter, such as vehicle lateral and longitudinal position coordinates, or a vehicle orientation angle; (3) a traffic light parameter, such as a red/yellow/green left turn light; (4) a lane line information parameter, such as a lane line position, a lane width, or a lane quantity; and (5) a road information parameter, such as a road type or whether there is an intersection. It should be understood that the vehicle driving scenario data may be obtained by using the foregoing in-vehicle apparatus such as a laser radar, a millimeter wave radar, a camera, or an ultrasound radar. Alternatively, based on a communication apparatus, the vehicle may be notified of surrounding driving scenario data of the vehicle by a control center through communication between the vehicle and the control center; or the vehicle may be notified of surrounding driving scenario data of the vehicle by another vehicle through communication between the vehicle and the another vehicle. Alternatively, a combination of the foregoing methods is used. This is not limited in this application. Some of the foregoing parameters are continuous parameters, and some of the foregoing parameters are discrete parameters. In some embodiments, discretization processing may be performed on the continuous parameters, to facilitate subsequent identification of a driving scenario.

The processor 1003 determines, based on at least the obtained vehicle driving behavior data and vehicle driving scenario data, whether the vehicle is in a state of abnormal driving behavior. In some embodiments, the processor may determine, based on the vehicle driving behavior data, the current vehicle driving scenario data, and algorithm logic 61 to 65, 71 and 72, or 81 and 82, whether the vehicle is in a state of abnormal driving behavior.

The various embodiments of this application provide the method for identifying abnormal driving behavior, the automated driving assistance system, the non-transient storage system, and the vehicle that includes the automated driving assistance system. In the technical solutions of this application, driving scenario information is introduced to an identification process of abnormal driving behavior of the vehicle, to resolve a problem of misidentification of abnormal driving behavior due to a lack of consideration of driving scenario information in the conventional technology. In addition, in the solutions of this application, a plurality of types of algorithm logic that match specific driving scenarios are made correspond to the specific driving scenarios, and abnormal driving behavior of the vehicle is determined by using a logical operation of an algorithm cluster of the plurality of types of algorithm logic. A person skilled in the art may alternatively properly adjust the algorithm logic based on an actual requirement. Therefore, the technical solutions of this application have good scalability. In addition, a code amount of the algorithm logic in the technical solutions of this application is relatively small. Therefore, the technical solutions of this application may be conveniently directly applied to a local vehicle, and therefore have an economic advantage. In summary, the technical solutions of this application may be widely applied to automated driving solutions, systems, and vehicles of different levels.

In the specification, claims, and accompanying drawings of this application, the terms “first”, “second”, “third”, “fourth”, and on the like (if existent) are intended to distinguish between similar objects but do not necessarily indicate a specific order or sequence. It should be understood that the data termed in such a way are interchangeable in proper circumstances so that embodiments described herein can be implemented in other orders than the order illustrated or described herein. Moreover, the terms “include”, “contain” and any other variants mean to cover the non-exclusive inclusion, for example, a process, method, system, product, or device that includes a list of steps or units is not necessarily limited to those steps or units, but may include other steps or units not expressly listed or inherent to such a process, method, product, or device.

It may be clearly understood by a person skilled in the art that, for the purpose of convenient and brief description, for a detailed working process of the foregoing system, apparatus, and unit, refer to a corresponding process in the foregoing method embodiments, and details are not described herein again.

In the several embodiments provided in this application, it should be understood that the disclosed system, apparatus, and method may be implemented in other manners. For example, the described apparatus embodiment is merely an example. For example, division into the units is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of embodiments.

In addition, function units in embodiments of this application may be integrated into one processing unit, or each of the units may exist alone physically, or two or more units are integrated into one unit. The integrated unit may be implemented in a form of hardware, or may be implemented in a form of a software function unit.

When the integrated unit is implemented in the form of a software function unit and sold or used as an independent product, the integrated unit may be stored in a computer-readable storage medium. Based on such an understanding, the technical solutions of this application essentially, or the part contributing to the conventional technology, or all or some of the technical solutions may be implemented in a form of a software product. The computer software product is stored in a storage medium, and includes several instructions for instructing a computer device (which may be a personal computer, a server, or a network device) to perform all or some of the steps of the methods described in embodiments of this application. The foregoing storage medium includes any medium that can store program code, such as a USB flash drive, a removable hard disk, a read-only memory (ROM), a random access memory (RAM), a magnetic disk, or an optical disc.

A person skilled in the art should be aware that in the foregoing one or more examples, services described in this application may be implemented by hardware, software, firmware, or any combination thereof. When the services are implemented by software, the services may be stored in a computer-readable medium or transmitted as one or more instructions or code in the computer-readable medium. The computer-readable medium includes a computer storage medium and a communication medium, where the communication medium includes any medium that enables a computer program to be transmitted from one place to another. The storage medium may be any usable medium accessible to a general-purpose or dedicated computer.

In the foregoing specific implementations, the objectives, technical solutions, and beneficial effects of this application are further described in detail. It should be understood that the foregoing descriptions are merely specific implementations of this application.

The foregoing embodiments are merely intended for describing the technical solutions of this application other than limiting this application. Although this application is described in detail with reference to the foregoing embodiments, persons of ordinary skill in the art should understand that they may still make modifications to the technical solutions described in the foregoing embodiments or make equivalent replacements to some technical features thereof, without departing from the scope of the technical solutions of embodiments of this application.

What is claimed is:

1. A method for identifying abnormal driving behavior of a vehicle as the vehicle is driving, comprising:

automatically obtaining current vehicle driving behavior data including vehicle control parameters obtained from an electronic control unit or control system or a sensor of the vehicle;

determining, based on the current vehicle driving behavior data, whether the vehicle is in a state of suspicious abnormal driving behavior;

obtaining current vehicle driving scenario data based on the vehicle being in the state of suspicious abnormal driving behavior;

classifying, using a trained neural network, the current vehicle driving scenario data based on ambient environment information of the vehicle representing a driving scenario in which the vehicle is located, wherein the ambient environment information of the vehicle includes continuous parameters and discrete parameters and discretization processing is performed on the continuous parameters, to determine a current vehicle driving scenario of the vehicle;

determining from a plurality of predetermined algorithm logic types a specific algorithm logic that matches the current vehicle driving scenario of the vehicle; and determining, based on at least the current vehicle driving behavior data and the specific algorithm logic, whether the suspicious abnormal driving behavior is abnormal driving behavior or normal driving behavior.

2. The method according to claim 1, wherein the determining, based on the current vehicle driving behavior data and the specific algorithm logic current vehicle driving scenario, whether the vehicle is in the state of suspicious abnormal driving behavior comprises:

extracting statistical feature values of the current vehicle driving behavior data, and performing cluster analysis on the statistical feature values to obtain the suspicious abnormal driving behavior, wherein the vehicle control parameters include at least one of the following: a vehicle speed, a vehicle acceleration, a vehicle orientation angle, or a lane line deviation value of the vehicle.

3. The method according to claim 2, wherein the cluster analysis comprises at least one of the following methods: principal components analysis (PCA), kernel principal components analysis (KPCA), locally linear embedding (LLE), or Laplacian eigenmap (LE).

4. The method according to claim 2, wherein the classifying the current vehicle driving scenario data to determine the current vehicle driving scenario comprises:

classifying the current vehicle driving scenario data using the trained neural network, to determine the current vehicle driving scenario, wherein the current vehicle driving scenario data comprises at least one of the following: a vehicle information parameter, an other-vehicle information parameter, a traffic signal parameter, a lane line parameter, or a road information parameter; and wherein the determining, based on at least the vehicle driving behavior data and the current vehicle driving scenario, whether the suspicious abnormal driving behavior is abnormal driving behavior comprises:

determining, based on at least the suspicious abnormal driving behavior and the current driving scenario, whether the suspicious abnormal driving behavior is abnormal driving behavior or normal driving behavior.

5. The method according to claim 1, wherein the trained neural network comprises at least one of the following: a convolutional neural network (CNN) or an extreme learning machine.

6. The method according to claim 1, wherein the current vehicle driving scenario comprises at least one of the following: intersection deceleration, road section deceleration, or lane line pressing.

7. The method according to claim 1, wherein the ambient environment information includes a vehicle information parameter, an other-vehicle information parameter, a traffic signal parameter, a lane line parameter, or a road information parameter.

8. The method according to claim 1, wherein the ambient environment information is obtained using a laser radar, a millimeter wave radar, a camera, or an ultrasound radar.

9. An automated driving assistance system, comprising:

at least one processor; and a memory coupled to the at least one processor and storing programming instructions for execution by the at least one processor, wherein the programming instructions instruct the at least one processor to perform the following operations:

automatically obtaining current vehicle driving behavior data of a vehicle as the vehicle is driving, the current vehicle driving behavior data including vehicle control parameters obtained from an electronic control unit or control system or a sensor of the vehicle;

obtaining current vehicle driving scenario data; and determining, based on the current vehicle driving behavior data, whether the vehicle is in a state of suspicious abnormal driving behavior, and based on the vehicle being in the state of suspicious abnormal driving behavior, classifying the current vehicle driving scenario data, using a trained neural network, based on ambient environment information of the vehicle representing a driving scenario in which the vehicle is located to determine a current vehicle driving scenario, wherein the ambient environment information of the vehicle includes continuous parameters and discrete parameters and discretization processing is performed on the continuous parameters, determining from a plurality of predetermined algorithm logic types a specific algorithm logic that matches the current vehicle driving scenario of the vehicle and determining, based on at least the current vehicle driving behavior data and the specific algorithm logic, whether the suspicious abnormal driving behavior is abnormal driving behavior or normal driving behavior.

10. The system according to claim 9, wherein the system comprises the electronic control unit (ECU).

11. The system according to claim 9, wherein the system comprises at least one of the following: a laser radar, a millimeter wave radar, an ultrasonic radar, or a digital camera.

12. The system according to claim 9, wherein the determining, based on the current vehicle driving behavior data, whether the vehicle is in the state of suspicious abnormal driving behavior comprises extracting statistical feature values of the current vehicle driving behavior data, and wherein cluster analysis is performed on the statistical feature values to obtain the suspicious abnormal driving behavior, wherein the vehicle control parameters include at least one of the following: a vehicle speed, a vehicle acceleration, a vehicle orientation angle, or a lane line deviation value of the vehicle.

13. The system according to claim 12, wherein the cluster analysis comprises at least one of the following methods: principal components analysis (PCA), kernel principal components analysis (KPCA), locally linear embedding (LLE), or Laplacian eigenmap (LE).

14. The system according to claim 9, wherein:

the trained neural network is used to classify the current vehicle driving scenario data, to determine the current vehicle driving scenario, wherein the current vehicle driving scenario data comprises at least one of the following: a vehicle information parameter, an other-vehicle information parameter, a traffic signal parameter, a lane line parameter, or a road information parameter; and the determining, based on at least the vehicle driving behavior data and the current vehicle driving scenario, whether the suspicious abnormal driving behavior is abnormal driving behavior comprises: determining, based on at least the suspicious abnormal driving behavior and the current driving scenario, whether the suspicious abnormal driving behavior is abnormal driving behavior or normal driving behavior.

15. The system according to claim 9, wherein the trained neural network comprises at least one of the following: a convolutional neural network (CNN) or an extreme learning machine (ELM).

16. The system according to claim 9, wherein the current vehicle driving scenario comprises at least one of the following: intersection deceleration, road section deceleration, or lane line pressing.

17. A computer program product comprising computer-executable instructions stored on a non-transitory computer-readable storage medium that, when executed by a processor, cause an apparatus to:

automatically obtain current vehicle driving behavior data of a vehicle as the vehicle is driving, the current vehicle driving behavior data including vehicle control parameters obtained from an electronic control unit or control system or a sensor of the vehicle;

determine, based on the current vehicle driving behavior data, whether a vehicle is in a state of suspicious abnormal driving behavior;

obtain current vehicle driving scenario data based on the vehicle being in the state of suspicious abnormal driving behavior;

classifying, using a trained neural network, the current vehicle driving scenario data based on ambient environment information of the vehicle representing a driving scenario in which the vehicle is located, wherein the ambient environment information of the vehicle includes continuous parameters and discrete parameters and discretization processing is performed on the continuous parameters, to determine a current vehicle driving scenario of the vehicle;

determining from a plurality of predetermined algorithm logic types a specific algorithm logic that matches the current vehicle driving scenario of the vehicle; and determine, based on at least the current vehicle driving behavior data and the specific algorithm logic, whether the suspicious abnormal driving behavior is abnormal driving behavior or normal driving behavior.

18. The computer program product of claim 17, wherein the instructions to determine, based on the current vehicle driving behavior data, whether the vehicle is in the state of suspicious abnormal driving behavior comprises instructions that cause the apparatus to extract statistical feature values of the current vehicle driving behavior data, and perform cluster analysis on the statistical feature values to obtain the suspicious abnormal driving behavior, wherein the vehicle control parameters include at least one of the following: a vehicle speed, a vehicle acceleration, a vehicle orientation angle, or a lane line deviation value of the vehicle.

19. The computer program product of claim 17, wherein the instructions to classify the current vehicle driving scenario data to determine the current driving scenario comprise instructions to: classify the current vehicle driving scenario data using the trained neural network, to determine the current vehicle driving scenario, wherein the current vehicle driving scenario data comprises at least one of the following: a vehicle information parameter, an other-vehicle information parameter, a traffic signal parameter, a lane line parameter, or a road information parameter; and wherein the instructions to determine, based on at least the vehicle driving behavior data and the current vehicle driving scenario, whether the suspicious abnormal driving behavior is abnormal driving behavior comprise instructions to: determine, based on at least the suspicious abnormal driving behavior and the current driving scenario, whether the suspicious abnormal driving behavior is abnormal driving behavior or normal driving behavior.

* * * * *